US010021357B2

(12) United States Patent
Hagiwara et al.

(10) Patent No.: US 10,021,357 B2
(45) Date of Patent: Jul. 10, 2018

(54) IMAGE CAPTURING APPARATUS AND METHOD FOR GENERATING IMAGE DATA

(71) Applicant: NIKON CORPORATION, Tokyo (JP)

(72) Inventors: Junya Hagiwara, Chigasaki (JP); Yusuke Takanashi, Yokohama (JP); Kiyoshige Shibazaki, Higashimurayama (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/471,377

(22) Filed: Mar. 28, 2017

(65) Prior Publication Data

US 2017/0272709 A1   Sep. 21, 2017

Related U.S. Application Data

(63) Continuation of application No. PCT/JP2015/075505, filed on Sep. 8, 2015.

(30) Foreign Application Priority Data

Sep. 30, 2014 (JP) ................................ 2014-201955

(51) Int. Cl.
H04N 9/083 (2006.01)
H04N 5/33 (2006.01)
(Continued)

(52) U.S. Cl.
CPC ............. *H04N 9/083* (2013.01); *G02B 5/201* (2013.01); *G02B 5/208* (2013.01); *G02B 7/006* (2013.01); *H04N 5/332* (2013.01)

(58) Field of Classification Search
CPC ........ H04N 9/083; H04N 5/332; G02B 7/006; G02B 5/201; G02B 5/208
See application file for complete search history.

(56) References Cited

U.S. PATENT DOCUMENTS 9,366,573 B2 *  6/2016  Geelen ..................... H04N 9/07
                                                    438/59
2007/0027362 A1 * 2/2007  Handa ...................... A61B 1/06
                                                    600/160

(Continued)

FOREIGN PATENT DOCUMENTS

JP    H05-028129 B2    4/1993
JP       2655571 B2    9/1997
(Continued)

OTHER PUBLICATIONS

Nov. 17, 2015 International Search Report issued in Patent Application No. PCT/JP2015/075505.
(Continued)

*Primary Examiner* — Hung Lam
(74) *Attorney, Agent, or Firm* — Oliff PLC

(57) ABSTRACT

An image capturing apparatus includes: photoelectric converting elements having a light reception sensitivity to light in a wavelength band from 600 to 2500 nm, and receiving an object light flux to output pixel signals; n types of wavelength filters (n>4) allowing passage therethrough of light included in the flux and is in wavelength bands being respectively different, each including the wavelength band; and an image data generator generating image data using the output from an element among those having received the flux passed through one of m types of the wavelength filters (3≤m<n) a combination determined based on a predetermined condition being determined such that among the respective wavelength bands of the m types of filters, a shortest-wavelength side wavelength band and a longest-wavelength side wavelength band overlap, and each filter among the m types allowing passage therethrough of light in the wavelength band including a predetermined effective wavelength band.

14 Claims, 17 Drawing Sheets

(51) Int. Cl.
　　　*G02B 5/20*　　　(2006.01)
　　　*G02B 7/00*　　　(2006.01)

(56) References Cited

U.S. PATENT DOCUMENTS

| | | |
|---|---|---|
| 2008/0123097 A1 | 5/2008 | Muhammed et al. |
| 2009/0012405 A1 | 1/2009 | Hasegawa et al. |
| 2012/0212619 A1 | 8/2012 | Nagamune |
| 2014/0084137 A1* | 3/2014 | De Groof ............. H01L 27/146 |
| | | 250/208.1 |
| 2016/0047690 A1* | 2/2016 | Yun ....................... G01J 1/0492 |
| | | 348/290 |

FOREIGN PATENT DOCUMENTS

| | | |
|---|---|---|
| JP | 2007-075445 A | 3/2007 |
| JP | 2008-518229 A | 5/2008 |
| JP | 2011-50049 A | 3/2011 |
| WO | 2007-083437 A1 | 7/2007 |

OTHER PUBLICATIONS

Nov. 17, 2015 Written Opinion of the International Searching Authority issued in Patent Application No. PCT/JP2015/075505.

\* cited by examiner

IMAGE CAPTURING APPARATUS AND METHOD FOR GENERATING IMAGE DATA

BACKGROUND

1. Technical Field

The present invention relates to an image capturing apparatus and a method for generating image data.

2. Related Art

Image capturing systems that allocate three invisible wavelength bands whose center wavelengths are different from each other to three visible primary colors (RGB) respectively are known (please see WO2007/083437, for example).

If this type of image capturing systems captures an image of an object that is reflective to light in a particular wavelength band using a wavelength filter that allows passage therethrough of light in a broader wavelength band including the particular wavelength band, it is difficult for the intensity within a spectrum in a very narrow band within the particular wavelength band to be reflected in the image. As a result, color discrimination on an object image becomes difficult in some cases. On the other hand, if the image capturing system captures an image of an object that is reflective to light in a particular wavelength band using a wavelength filter that allows passage therethrough of only a partial wavelength band within the particular wavelength band, only an object light flux in the partial wavelength band can be reflected in the image. As a result, in this case also, color discrimination on an object image becomes difficult in some cases.

SUMMARY

Therefore, it is an object of an aspect of the innovations herein to provide an image capturing apparatus and a method for generating image data, which are capable of overcoming the above drawbacks accompanying the related art. The above and other objects can be achieved by combinations described in the claims. A first aspect of the innovations may include an image capturing apparatus including:
a plurality of photoelectric converting units that have a light reception sensitivity to light in a wavelength band from 600 nm to 2500 nm, and receive an object light flux to output pixel signals;
n types of wavelength filters (n is a natural number equal to or higher than four) that allow passage therethrough of light that is included in the object light flux and is in wavelength bands that are respectively different and each include the wavelength band from 600 nm to 2500 nm; and
an image data generating unit that generates image data using the pixel signal output from a photoelectric converting unit among the plurality of photoelectric converting units that has received the object light flux that has passed through one of m types of the wavelength filters (m is a natural number equal to or larger than three and smaller than n) a combination of which is determined based on a predetermined condition, wherein
the combination is determined such that among the respective wavelength bands of the m types of wavelength filters, a shortest-wavelength side wavelength band and a longest-wavelength side wavelength band overlap, and each wavelength filter among the m types of wavelength filters allows passage therethrough of light in the wavelength band including a predetermined effective wavelength band.

A second aspect of the innovations may include an image data generating method to be used in an image capturing apparatus having:
a plurality of photoelectric converting units that have a light reception sensitivity to light in a wavelength band from 600 nm to 2500 nm, and receive an object light flux to output pixel signals; and
n types of wavelength filters (n is a natural number equal to or higher than four) that allow passage therethrough of light that is included in the object light flux and is in wavelength bands that are respectively different and each include the wavelength band from 600 nm to 2500 nm,
the method including:
determining a combination of m types of of the wavelength filters (m is a natural number equal to or larger than three and smaller than n) among the plurality of photoelectric converting units based on a predetermined condition; and
generating image data using the pixel signal output from a photoelectric converting unit that has received the object light flux having passed through one of the m types of wavelength filters, wherein
the combination is determined such that among the respective wavelength bands of the m types of wavelength filters, a shortest-wavelength side wavelength band and a longest-wavelength side wavelength band overlap, and each wavelength filter among the m types of wavelength filters allows passage therethrough of light in the wavelength band including a predetermined effective wavelength band.

The summary clause does not necessarily describe all necessary features of the embodiments of the present invention. The present invention may also be a sub-combination of the features described above.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
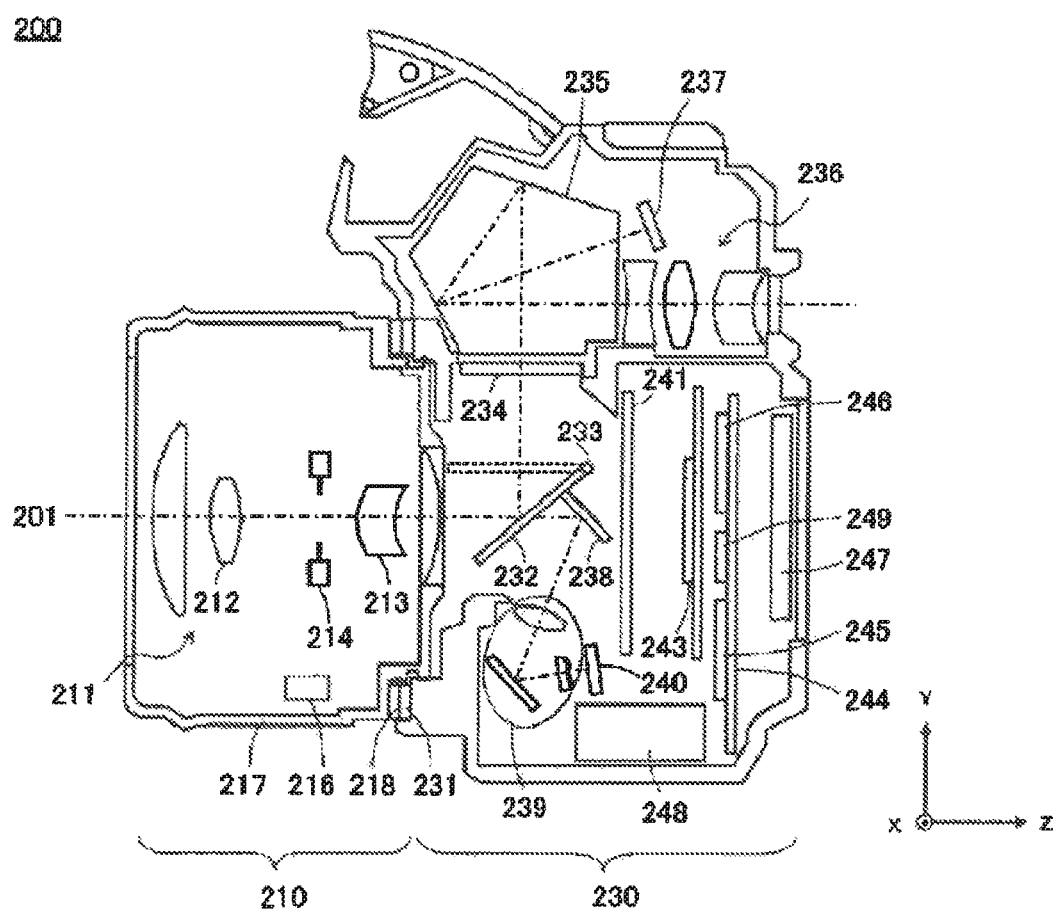
FIG. 1 is a cross sectional view of main parts of a single-lens reflex camera according to the present embodiment.

FIG. 1 is a cross sectional view of main parts of a single-lens reflex camera 200 according to the present embodiment. The single-lens reflex camera 200 is configured with a combination of a lens unit 210 which serves as an image capturing lens, and a camera unit 230 which serves as a camera body; thereby, it functions as an image capturing apparatus.

The lens unit 210 includes a lens group 211 arrayed along an optical axis 201. The lens group 211 includes a focus lens 212 and a zoom lens 213. Also, an aperture stop 214 is arrayed along the optical axis 201.

The lens unit 210 includes a lens system control unit 216 that performs control and arithmetic operation for the lens unit 210 such as drive of the focus lens 212 and the aperture stop 214. Upon receiving a control signal from a camera system control unit 245 mentioned below, the lens system control unit 216 performs various operations. Respective elements constituting the lens unit 210 are supported by a lens barrel 217.

Also, the lens unit 210 includes a lens mount 218 at a connection unit at which it connects to the camera unit 230, and engages with a camera mount 231 provided to the camera unit 230 to be integrated with the camera unit 230. The lens mount 218 and the camera mount 231 each include an electrical connection unit in addition to a mechanical engagement unit, thereby enabling electrical power supply from the camera unit 230 to the lens unit 210 and intercommunication therebetween.

The camera unit 230 includes a main mirror 232 that is reflective to an object image entering from the lens unit 210, and a focusing screen 234 on which the object image reflected by the main mirror 232 is formed. By being rotated about a rotation axis 233, the main mirror 232 can be at a position where it is disposed obliquely relative to and in the object light flux centering on the optical axis 201 and at a position where it retreats from the object light flux. When guiding the object image toward the focusing screen 234 side, the main mirror 232 is disposed obliquely relative to and in the object light flux. Also, the focusing screen 234 is arranged at a position conjugate to a light-receiving surface of an image sensor 243.

The object image formed on the focusing screen 234 is converted into an erect image by a pentaprism 235 and observed by a user through an eyepiece optical system 236. Also, an AE sensor 237 is arranged above an exit surface of the pentaprism 235 and detects a luminance distribution of the object image.

A region which is part of the main mirror 232 in the obliquely-disposed state and is near the optical axis 201 is formed as a half mirror, and allows part of the light flux incident thereon to pass therethrough. The light flux that has passed therethrough is reflected by a sub mirror 238 that operates in an interlocking manner with the main mirror 232, and guided to an AF optical system 239. The object light flux that has passed through the AF optical system 239 enters an AF sensor 240. The AF sensor 240 detects a phase difference signal in the object light flux received. In the present embodiment, the AF sensor 240 is configured to perform focusing using near-infrared light. When the main mirror 232 retreats from the object light flux, the sub mirror 238 retreats from the object light flux in an interlocking manner with the main mirror 232.

A focal plane shutter 241 and the image sensor 243 are arrayed behind the obliquely disposed main mirror 232 and along the optical axis 201. The focal plane shutter 241 is in an opened state when it guides the object light flux toward the image sensor 243 and otherwise is in a closed state.

The image sensor 243 is, for example, a near-infrared photoelectric conversion element such as a CMOS sensor, and converts the object image formed on the light-receiving surface into a pixel signal. The image sensor 243 has a plurality of pixels arrayed two-dimensionally. Each pixel among the plurality of pixels includes a photoelectric converting unit that receives the object light flux to output the pixel signal, and a wavelength filter provided corresponding to the photoelectric converting unit. Details of the wavelength filters are mentioned below. As the image sensor 243, an image sensor including an InGaAs-based material may be used. In the present embodiment, the photoelectric converting units of the image sensor 243 are sensitive to light in a wavelength band from 900 nm to 1700 nm within the near-infrared band from 800 nm to 2500 nm. Using another material for the image sensor 243, it can have light reception sensitivity to light in a wavelength band from 600 nm to 2500 nm that covers part of the visible band.

According to an instruction from the camera system control unit 245, an image processing unit 246 mounted on a main substrate 244 processes the pixel signals photoelectrically converted by the image sensor 243 to generate image data. The image processing unit 246 and the camera system control unit 245 cooperate with each other to play the role of an image data generating unit that generates the image data using the pixel signals output from a photoelectric converting unit among the plurality of photoelectric converting units that has received the object light flux having passed through one of m types of wavelength filters. Here, m is a natural number equal to or larger than three and smaller than n, and n is a natural number equal to or larger than four. Although details are mentioned not here but below, a combination of the m types of wavelength filters is determined according to predetermined conditions. Also, although details are mentioned not here but below, the image processing unit 246 converts the pixel signal corresponding to the near-infrared (that is, invisible) wavelength band into a pixel signal corresponding to the visible wavelength band to generate full color image data. In this specification, such color image data is referred to as "NIR-R'G'B' converted image data" in some cases, and a color image displayed based on the color image data, that is, a color image converted into a visible display system is referred to as an "NIR-R'G'B' converted image" in some cases.

A camera memory 249 mounted on the main substrate 244 records programs, various parameters and the like used to control the single-lens reflex camera 200. The camera memory 249 stores, as predetermined conditions, information about a combination of the wavelength filters that meets conditions mentioned below. In the present embodiment, the camera memory 249 stores, as a table, information that indicates the wavelength filters included in a broad-type filter set and information that indicates the wavelength filters included in a narrow-type filter set which are mentioned below.

On the main substrate 244, furthermore, the camera system control unit 245 that is an MPU which centrally controls the system of the camera unit 230 is mounted. The camera system control unit 245 manages a camera sequence, and performs input/output processes and the like of each constituent element. Also, the camera system control unit 245 plays the role of an accepting unit that accepts an instruction from the user.

On the back face of the camera unit 230, a display unit 247 formed by a liquid crystal monitor or the like is disposed. The image data processed by the image processing unit 246, that is, the NIR-R'G'B' converted image data is sent to the display unit 247 and displayed thereon. The user can view the NIR-R'G'B' converted image displayed on the display unit 247. On the display unit 247, a menu screen for various settings is also displayed. The user can select a combination of the wavelength filters via a manipulation member while checking the menu screen displayed on the display unit 247. Also, the camera unit 230 houses an attachable/detachable secondary battery 248 that supplies electrical power not only to the camera unit 230 but also to the lens unit 210.

Figure 2:
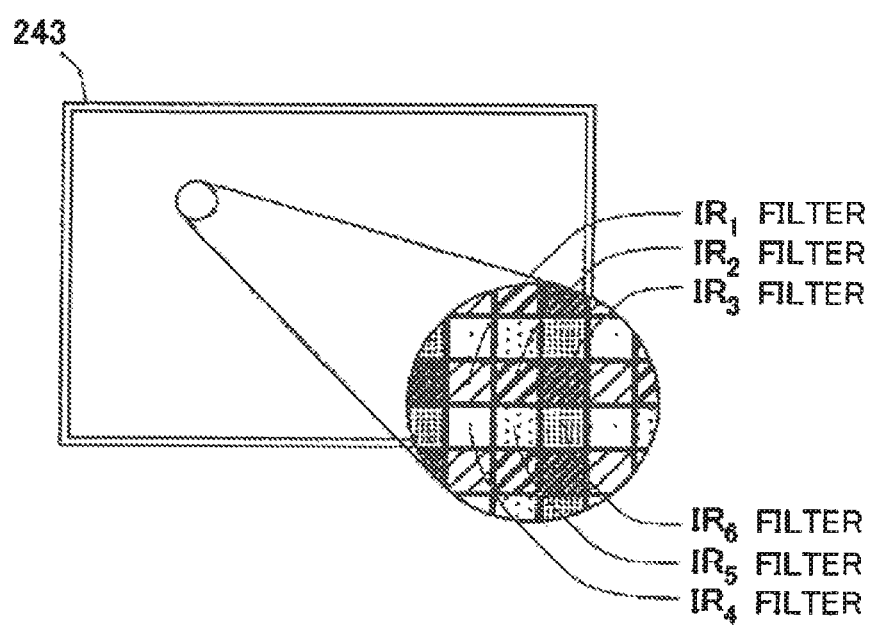
FIG. 2 is a figure for explaining wavelength filters arranged on respective photoelectric converting units of an image sensor.

FIG. 2 is a figure for explaining wavelength filters arranged on respective photoelectric converting units of an image sensor 243. The number of the types of wavelength filters is four or larger. In the present embodiment, the number of the types of wavelength filters is six. Each type of wavelength filters allows passage therethrough of light that is included in an object light flux and is in a wavelength band different from those for the other types. Each type of wavelength filters allows passage therethrough of light that is included in an object light flux and is in the near-infrared wavelength band. The respective types of wavelength filters are provided to light-receiving surfaces of the plurality of a photoelectric converting units in one-to-one relationships with the the plurality of photoelectric converting units. In the present embodiment, as illustrated in the figure, one of an $IR_1$ filter, an $IR_2$ filter, an $IR_3$ filter, an $IR_4$ filter, an $IR_5$ filter and an $IR_6$ filter is provided on each photoelectric converting unit. More specifically, rows each including the $IR_1$ filter, the $IR_2$ filter and the $IR_3$ filter arranged repeatedly in this order, and rows each including the $IR_4$ filter, the $IR_5$ filter and the $IR_6$ filter arranged repeatedly in this order are provided alternately in a column direction. The array of the wavelength filters is not limited to the one shown in the present example.

In this specification, if it is not necessary to specifically make distinctions among the above-mentioned six filters, that is, if any one of them is mentioned, the filter is referred to simply as an "IR filter" in some cases. If the six filters are mentioned collectively, they are referred to as "$IR_{1-6}$ filters" in some cases. Also, the $IR_1$ filter, the $IR_2$ filter and the $IR_3$ filter are collectively referred to as the "$IR_{1-3}$ filters" if the three filters are referred to, and the $IR_4$ filter, the $IR_5$ filter and the $IR_6$ filter are collectively referred to as the "$IR_{4-6}$ filters" if the three filters are referred to, in some cases.

Although details are mentioned not here but below, a combination of the $IR_1$ filter, the $IR_2$ filter and the $IR_3$ filter meets conditions mentioned below, and this combination is referred to as a broad-type filter set in this specification. Similarly, a combination of the $IR_4$ filter, the $IR_5$ filter and the $IR_6$ filter meets conditions mentioned below, and this combination is referred to as a narrow-type filter set in this specification. The filters are associated with mutually different visible wavelength bands, respectively. Similarly, the $IR_{4-6}$ filters are associated with mutually different visible wavelength bands, respectively. In the present embodiment, the wavelength bands of the $IR_1$ filter and the $IR_4$ filter are associated with the blue wavelength band, the wavelength bands of the $IR_2$ filter and the $IR_5$ filter are associated with the green wavelength band, and the wavelength bands of the $IR_3$ filter and the $IR_6$ filter are associated with the red wavelength band.

The wavelength bands to which respective pixels are sensitive are regulated by IR filters provided to the respective pixels. The details of the regulated wavelength bands are mentioned below. In the image sensor 243 as a whole, each among the plurality of two-dimensionally arrayed pixels includes one of the $IR_{1-6}$ filters discretely. Therefore, it can be said that the image sensor 243 separates the object light flux incident thereon into light in the respective wavelength bands and detects the light in the respective wavelength bands. In other words, the image sensor 243 separates the object image formed on the light-receiving surface into light in the six near-infrared wavelength bands and photoelectrically converts the light in the six near-infrared wavelength bands.

In the present embodiment, whether to use a broad-type filter set or a narrow-type filter set, that is, whether to use pixel signals of pixels corresponding to a broad-type filter set or pixel signals of pixels corresponding to a narrow-type filter set is preset by a user. The camera system control unit 245 determines a combination by referring to a table according to the setting. That is, it determines whether to use pixel signals of pixels corresponding to a broad-type filter set or pixel signals of pixels corresponding to a narrow-type filter set. Thereafter, according to the combination determined by the camera system control unit 245, the image processing unit 246 uses pixel signals of pixels which are among pixel signals of all the pixels and correspond to either one of the broad-type filter set and the narrow-type filter set to generate NIR-R'G'B' converted image data. In this case, pixel values of pixels corresponding to the other filter set are temporarily eliminated, and are calculated by an interpolation process using pixel values of surrounding pixels. The image processing unit 246 may receive pixel signals of all the pixels or receive only pixel signals of pixels corresponding to a determined filter set.

Figure 3A:
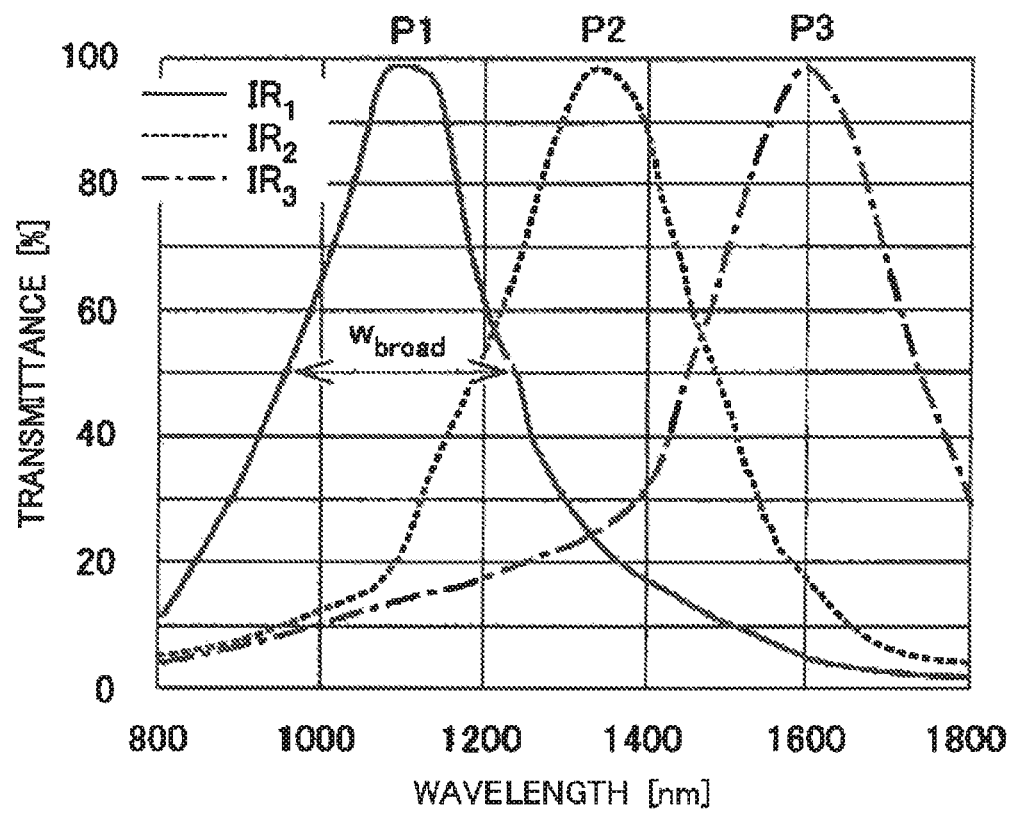
FIG. 3A is a figure for explaining a type of a filter set.
Figure 3B:
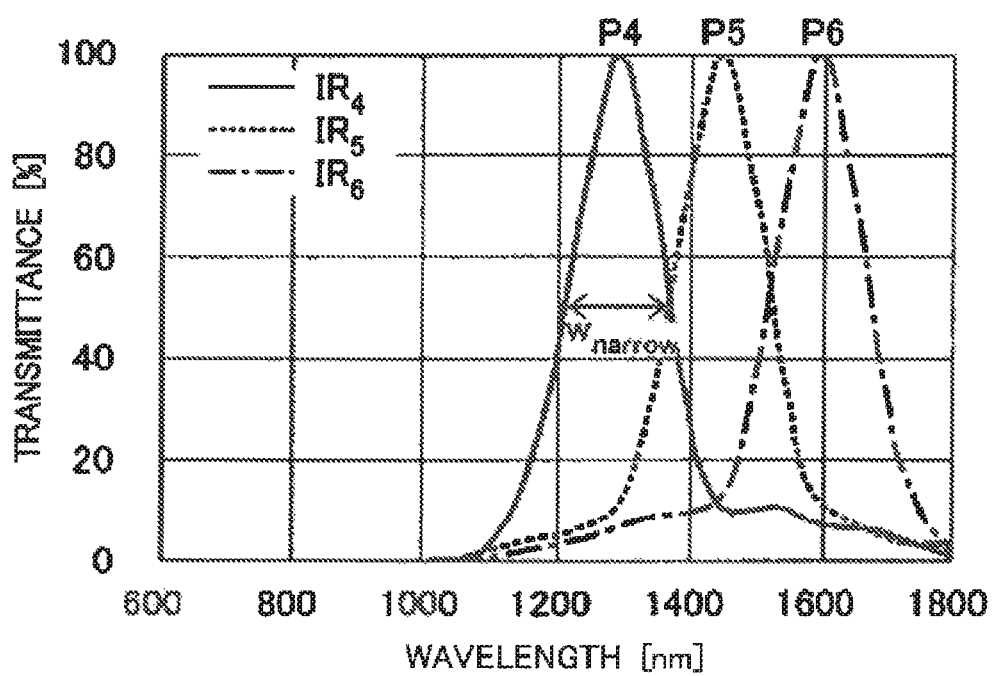
FIG. 3B is a figure for explaining a type of a filter set.

FIG. 3A and FIG. 3B are figures for explaining types of filter sets. FIG. 3A shows characteristics of a broad-type filter set, and FIG. 3B shows characteristics of a narrow-type filter set. In FIG. 3A and FIG. 3B, the horizontal axes indicate wavelengths [nm] and the vertical axes indicate transmittances [%]. In FIG. 3A, the solid line indicates wavelength characteristics of the $IR_1$ filter, the dashed line indicates wavelength characteristic of the $IR_2$ filter, and the dotted-dashed line indicates wavelength characteristics of the $IR_3$ filter. In FIG. 3B, the solid line indicates wavelength characteristics of the $IR_4$ filter, the dashed line indicates wavelength characteristic of the $IR_5$ filter, and the dotted-dashed line indicates wavelength characteristics of the $IR_6$ filter. The figures show that the amount of light that reaches a photodiode constituting a photoelectric converting unit increases as the transmittance for the wavelength of the light increases.

As shown in FIG. 3A, the waveforms showing wavelength characteristics of the $IR_1$ filter, the $IR_2$ filter and the $IR_3$ filter are approximately the same overall, and their transmitting wavelength bands are different from each other. The respective half-value widths of the $IR_{1-3}$ filters are substantially the same. Being "substantially the same" means also that although they may not be strictly the same due to manufacturing errors of the $IR_{1-3}$ filters or the like, their differences are minute, and they can be regarded as being the same. In this manner, if the waveforms showing respective wavelength characteristics of the $IR_{1-3}$ filters are equal to each other overall, noise components attributable to gains can be suppressed when color conversion processing mentioned below is performed. Also, the $IR_1$ filter has its peak located on the shortest-wavelength side among the $IR_{1-3}$ filters, and its peak wavelength P1 is about 1080 nm. The peak wavelength P1 is the center wavelength of the half-value width of the $IR_1$ filter. The $IR_2$ filter has its peak between the peak of the $IR_1$ filter and the peak of the $IR_3$ filter, and its peak wavelength P2 is about 1330 nm. The $IR_3$ filter has its peak located on the longest-wavelength side among the $IR_{1-3}$ filters, and its peak wavelength P3 is about 1600 nm. The broad-type filter set, with the $IR_1$ filter, the $IR_2$ filter and the $IR_3$ filter, covers the entire sensitivity band of the photoelectric converting units which is from 900 nm to 1700 nm.

As shown in FIG. 3B, the waveforms showing wavelength characteristics of the $IR_4$ filter, the $IR_5$ filter and the $IR_6$ filter are approximately the same overall, and their wavelength bands are different from each other. The respective half-value widths of the $IR_{4-6}$ filters are substantially the same. The meaning of being "substantially the same" is the same as the one that has already been explained. Also, the $IR_4$ filter has its peak located on the shortest-wavelength side among the $IR_{4-6}$ filters, and its peak wavelength P4 is about 1280 nm. The $IR_5$ filter has its peak between the peak of the $IR_4$ filter and the peak of the $IR_6$ filter, and its peak wavelength P5 is about 1430 nm. The $IR_6$ filter has its peak located on the longest-wavelength side among the $IR_{4-6}$ filters, and its peak wavelength P6 is about 1580 nm.

As illustrated in the figures, the wavelength bandwidths of the respective $IR_{4-6}$ filters included in the narrow-type filter set are narrower than the wavelength bandwidths of the respective $IR_{1-3}$ filters included in the broad-type filter set. For example, comparison of the half-value widths shows that while the half-value width $w_{broad}$ of the $IR_1$ filter is approximately 300 nm, the half-value width $w_{narrow}$ of the $IR_4$ filter is approximately 150 nm. The narrow-type filter set covers a particular range within a range from 900 nm to 1700 nm. In the present embodiment, the $IR_4$ filter, the $IR_5$ filter and the $IR_6$ filter included therein cover a range from around 1100 nm to around 1800 nm.

Figure 4:
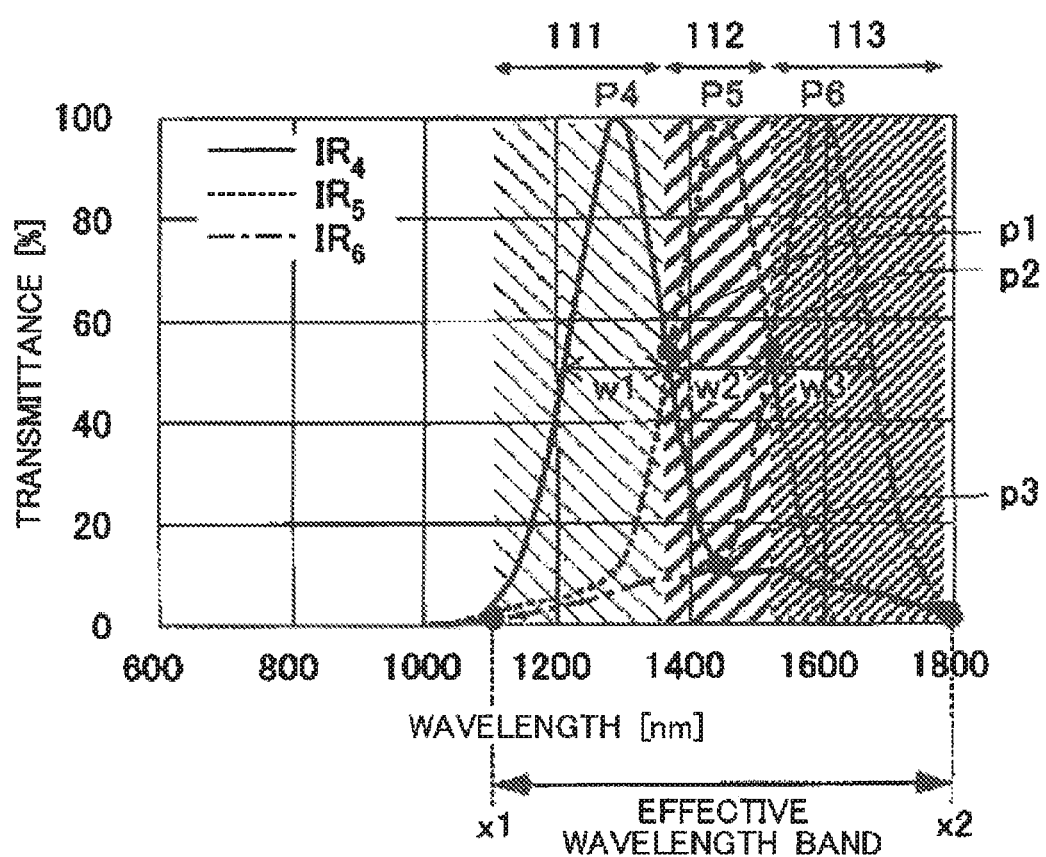
FIG. 4 is a figure for explaining conditions for wavelength filters included in a filter set.

FIG. 4 is a figure for explaining conditions for wavelength filters included in a filter set. The horizontal axis indicates wavelengths [nm] and the vertical axis indicates transmittances [%]. Although the narrow-type filter set is explained here as an example, the same applies also to the broad-type filter set.

As mentioned above, the image processing unit 246 converts a near-infrared wavelength band pixel signal into a visible wavelength band pixel signal. At this time, if the respective wavelength bands of the $IR_{4-6}$ filters are discrete, there will be a band in the wavelength band covered by the narrow-type filter set where object information cannot be acquired. This makes it difficult to express colors precisely if the image processing unit 246 generates NIR-R'G'B' converted image data.

In the present embodiment, as illustrated in the figures, the $IR_4$ filter and the $IR_5$ filter, and the $IR_5$ filter and the $IR_6$ filter, which are adjacent to each other in terms of their wavelength bands, have sufficient overlapping portions. At intersections p1, p2 between the mutually adjacent wavelength bands, the transmittances are preferably 50% or higher. Also, if the respective half-value widths of the $IR_{4-6}$ filters are w1, w2 and w3, they preferably meet the following conditions. Each of P4 to P6 shows a peak wavelength as have already been explained.

$(P5-P4) \le w1, w2$ $(P6-P5) \le w2, w3$

On the other hand, the wavelength band of the $IR_4$ filter and the wavelength band of the $IR_6$ filter are not discrete, but have overlapping portions to some degree. In other words, part of the shortest-wavelength side wavelength band and part of the longest-wavelength side wavelength band among the respective wavelength bands of the narrow-type filter set overlap each other. Being "located on the shortest-wavelength side" means the peak wavelength of the wavelength band being mentioned is located on the shortest-wavelength side, and being "located on the longest-wavelength side" means that the peak wavelength of the wavelength band being mentioned is located on the longest-wavelength side. Therefore, there is an intersection p3 between the waveform of the $IR_4$ filter and the waveform of the $IR_6$ filter. The transmittance at this intersection p3 is desirably 10% or higher. Furthermore, in the respective waveforms of the $IR_{4-6}$ filters, skirt portions that incline gently and extend out are provided in regions where the transmittance is 20% or lower. Furthermore, the $IR_5$ filter located between the $IR_4$ filter and the $IR_6$ filter similarly overlaps the $IR_4$ filter and the $IR_6$ filter, respectively. Therefore, in summary, the $IR_{4-6}$ filters respectively overlap each other over broader ranges of their wavelength bands. Assuming that the shortest-wavelength side wavelength of the $IR_4$ filter at which the transmittance is 1% or higher X1, and the longest-wavelength side wavelength of the $IR_6$ filter at which the transmittance is 1% or higher is X2, all the $IR_{4-6}$ filters preferably have the transmittances of 1% or higher in the effective wavelength band which is the range from X1 to X2. As a result, a pixel provided with the $IR_4$ filter is sensitive, to a certain degree, to the wavelength band 112 as well as the wavelength band 111, and further is sensitive, to some degree, to the wavelength band 113. Similarly, a pixel provided with the $IR_6$ filter is sensitive, to a certain degree, to the wavelength band 112 as well as the wavelength band 113, and further is sensitive, to some degree, to the wavelength band 111. A pixel provided with the $IR_5$ filter is sensitive, to a certain degree, to the wavelength band 111 and the wavelength band 113 as well as the wavelength band 112.

Although in the explanation above, a transmittance, that is, characteristics singly of a wavelength filter, is indicated along vertical axes, the same applies if the transmittance is replaced with spectral response. For example, the spectral response defined by a combination of a wavelength filter and a photoelectric converting unit may be 50% or higher at the intersections p1, p2 between mutually adjacent wavelength bands, or may be 1% or higher in the effective wavelength band.

In generating NIR-R'G'B' converted image data, the image processing unit 246 not only associates the respective $IR_{4-6}$ filters of mutually different visible wavelength bands, but also uses pixel signals of the respective wavelength bands of the $IR_{4-6}$ filters to convert them into visible wavelength band pixel signals. For example, a pixel signal of the wavelength band of the $IR_4$ filter is converted into a visible wavelength band pixel signal using, in addition to the pixel signal of the wavelength band of the IR$_4$ filter, a pixel signal of the wavelength band of the IR$_5$ filter and a pixel signal of the wavelength band of the IR$_6$ filter. In this manner, color expression at high resolution can be achieved using pixel signals of all the wavelength bands of the IR$_{4-6}$ filters. As one example, as shown below, the image processing unit 246 performs color conversion processing by performing matrix operation. Each of R', G' and B' indicates a pixel signal obtained by conversion from a near-infrared wavelength band pixel signal into a visible wavelength band pixel signal, NIR1 indicates a pixel signal of the wavelength band of the IR$_4$ filter, NIR2 indicates a pixel signal of the wavelength band of the IR$_5$ filter, and NIR3 indicates a pixel signal of the wavelength band of the IR$_6$ filter. a1, a2, a3, b1, b2, b3, c1, c2 and c3 are coefficients for color conversion.

$$R'=a1\times NIR1+b1\times NIR2+c1\times NIR3$$

$$G'=a2\times NIR1+b2\times NIR2+c2\times NIR3$$

$$B'=a3\times NIR1+b3'NIR2+c3\times NIR3$$

Because in the above-mentioned equations, if pixels provided with the IR$_{4-6}$ filters are sensitive, R', G' and B' can be converted using all of the NIR1-3, as the widths of the ranges at which the respective wavelength bands of the IR$_{4-6}$ filters overlap increase, the number of colors that are reflected in color expression can be increased.

To enhance the resolution of color expression, as mentioned above, all the IR$_{4-6}$ filters preferably have transmittances of 1% or higher in the effective wavelength band, but at least at the peak wavelength of the wavelength band of the IR$_4$ filter located on the shortest-wavelength side, the wavelength band of the IR$_6$ filter located on the longest-wavelength side may overlap. Specifically, at about 1280 nm which is the peak wavelength of the wavelength band of the IR$_4$ filter, the IR$_6$ filter has a transmittance of 1% or higher. On the other hand, at least at the peak wavelength of the wavelength band of the IR$_6$ filter located on the longest-wavelength side, the wavelength band of the IR$_4$ filter located on the shortest-wavelength side may overlap. Specifically, at about 1580 nm which is the peak wavelength of the wavelength band of the IR$_6$ filter, the IR$_4$ filter has a transmittance of 1% or higher. Because with such a combination also, the IR$_{4-6}$ filters overlap each other over a range of wavelength bands including at least the respective peak wavelengths, color expression with many colors becomes possible.

Figure 5:
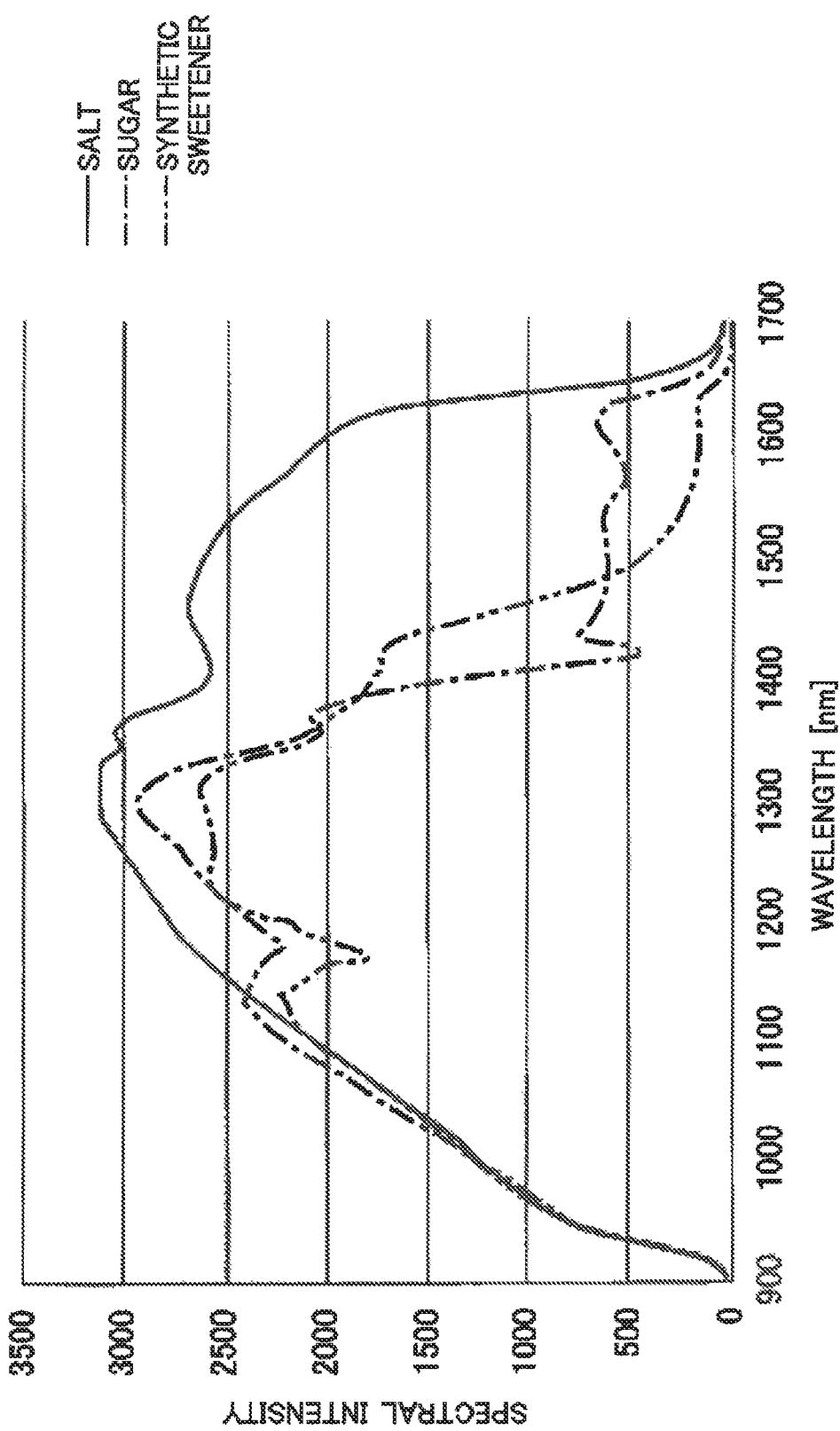
FIG. 5 is a figure for explaining spectrums and NIR-R'G'B' converted images of objects.

FIG. 5 is a figure for explaining spectrums and NIR-R'G'B' converted images of objects. The horizontal axis indicates wavelengths [nm] and the vertical axis indicates spectral intensity. In the following explanation, salt, sugar and synthetic sweetener are treated as examples of object. The solid line indicates the spectrum of salt, the dotted-dashed line indicates the spectrum of sugar, and the long dashed double-short dashed line indicates the spectrum of synthetic sweetener.

As illustrated in the figure, salt has spectral intensity over a broad range in the near-infrared wavelength band. More specifically, the spectral intensity of salt increases from around 0 to just over 3000 in a range from 900 nm to around 1300 nm, and decreases from just over 3000 to around 0 in a range from around 1300 nm to around 1700 nm. In particular, it decreases gently from just over 3000 to around 2000 in a range from around 1300 nm to around 1600 nm, and decreases sharply in a range from around 1600 nm.

The spectral intensity of sugar increases from around 0 to around 3000 in a range from 900 nm to around 1300 nm, and decreases from around 3000 to around 0 in a range from around 1300 nm to around 1700 nm. More specifically, it decreases sharply from around 3000 to around 500 in a range from around 1300 nm to around 1450 nm, stays flat overall in a range from around 1400 nm to around 1500 nm, and decreases sharply in a range from around 1650 nm to around 1700 nm.

The spectral intensity of synthetic sweetener increases from around 0 to just over 2500 in a range from 900 nm to around 1300 nm, and decreases from just over 2500 to around 0 in a range from around 1300 nm to around 1700 nm. More specifically, it decreases sharply from just over 2500 to around 500 in a range from around 1300 nm to around 1500 nm, and decreases gently in a range from around 1500 nm to around 1700 nm.

In the following explanation, it is explained how differences in the filter sets affect NIR-R'G'B' converted image data to be generated if the single-lens reflex camera 200 captures an image of the above-mentioned three objects and generates the NIR-R'G'B' converted image data. All of salt, sugar and synthetic sweetener are recognized as being white in an RGB image which is a color image generated from visible wavelength band pixel signals.

First, the case where the broad-type filter set is used is explained. As mentioned above, the spectral intensity of salt lies in a broad range of the near-infrared wavelength band. Because salt reflects near-infrared wavelength band light relatively uniformly, it is recognized as being white also in an NIR-R'G'B' converted image. On the other hand, the spectral intensities of sugar and synthetic sweetener do not show large differences from the spectral intensity of salt in a range from 900 nm to around 1300 nm, but is considerably different from the spectral intensity of salt in a range over around 1300 nm. Because the spectral intensities corresponding to the wavelength bands of the IR$_2$ filter and the IR$_3$ filter are relatively low, they are recognized as being bluish overall in the NIR-R'G'B' converted image. In this manner, even if salt cannot be discriminated from sugar and synthetic sweetener in terms of color in an RGB image generated based on visible wavelength band information, they can be discriminated easily in terms of color in an NIR-R'G'B' converted image generated based on near-infrared wavelength band information. Also, it can be expected to make it easier to make distinctions among differences in the structures of respective objects thanks to color discrimination.

As mentioned above, the waveform showing the spectral intensity of sugar and the waveform showing the spectral intensity of synthetic sweetener are not the same. For example, while the spectral intensity of synthetic sweetener is higher than the spectral intensity of sugar in a range from around 1400 nm to around 1500 nm, the spectral intensity of sugar is higher than the spectral intensity of synthetic sweetener in a range from around 1500 nm to around 1700 nm. Therefore, sugar and synthetic sweetener are recognized as being mutually differently bluish. However, if the broad-type filter set is used, a pixel provided with the IR$_3$ filter receives light in a wavelength band including a range from around 1400 nm to around 1700 nm. That is, light in wavelength bands limited to a range from around 1400 nm to around 1500 nm or a range from around 1500 nm to around 1700 nm is not the only one to be received. Therefore, it is difficult for differences in the spectral intensities in very narrow wavelength bands as mentioned above to be reflected; as a result, this may produce an image on which color discrimination is difficult in some cases.

Next, the case where the narrow-type filter set is used is explained. Because salt has spectral intensity in a broad range of the near-infrared wavelength band, similar to the case of using the broad-type filter set, it is recognized as being white also in an NIR-R'G'B' converted image. Also, because the peak wavelengths of the spectral intensities of sugar and synthetic sweetener are around 1300 nm, similar to the case of using the broad-type filter set, sugar and synthetic sweetener are recognized as being bluish overall in an NIR-R'G'B' converted image. However, if the narrow-type filter set is used, it becomes easier for differences in the spectral intensities in very narrow bands to be reflected because the transmitting wavelength band is more limited; as a result, an image on which color discrimination is easy is produced. Specifically, because the spectral intensity of sugar decreases on the shorter-wavelength side than the spectral intensity of synthetic sweetener does, in an NIR-R'G'B' converted image, sugar is recognized as being purple (more reddish blue), and synthetic sweetener is recognized as being blue green (more greenish blue). Therefore, a user can naturally discriminate salt from sugar and synthetic sweetener in terms of color easily, and can additionally discriminate sugar from synthetic sweetener in terms of color relatively easily.

If a user directly sees a plurality of objects with his/her eyes, that is, if he/she looks at a plurality of objects in the visible wavelength band, it is difficult for him/her to discriminate the plurality of objects in terms of color if the plurality of objects have similar colors. According to the single-lens reflex camera 200 of the present embodiment, even in such a case, near-infrared wavelength band information can be used to generate image data with which colors of a plurality of objects can be discriminated from each other easily. Furthermore, the single-lens reflex camera 200 can alter a combination of wavelength filters corresponding to an object by accepting, from a user, setting information about combinations of wavelength filters appropriately. Also, as explained with reference to FIG. 5 and FIG. 6, in terms of color discrimination, it is preferable to use information of wavelength bands where differences between the spectrums of respective objects are relatively large. In particular, depending on the spectrums of objects, not the entire near-infrared wavelength band is utilized, but only a limited wavelength band where differences in the spectral intensities are observed is utilized so that NIR-R'G'B' converted image data on which color discrimination is easy can be obtained.

Figure 6:
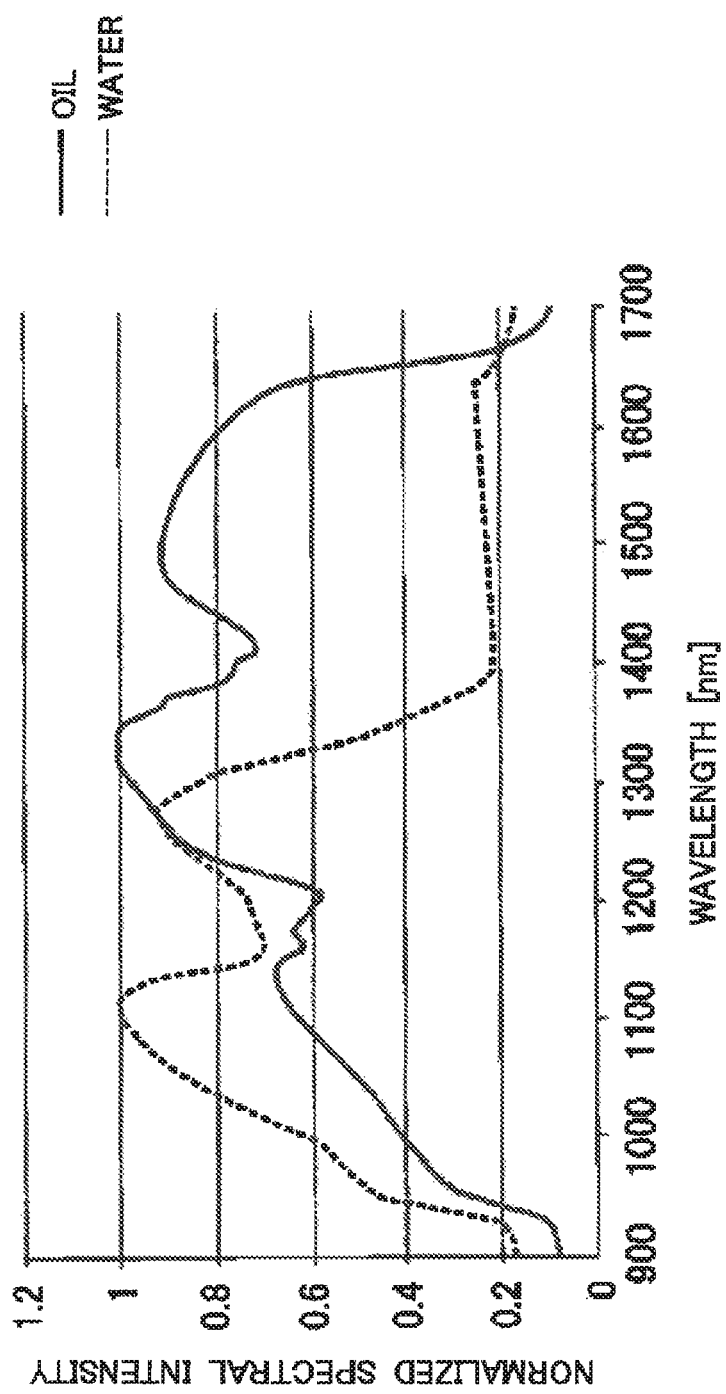
FIG. 6 is a figure for explaining spectrums and NIR-R'G'B' converted images of other objects.

FIG. 6 is a figure for explaining spectrums and NIR-R'G'B' converted images of other objects. The horizontal axis indicates wavelengths [nm] and the vertical axis indicates normalized spectral intensity. In the following explanation, oil and water are treated as examples of objects. The solid line indicates the spectrum of oil, and the dashed line indicates the spectrum of water. Oil and water are both recognized as being colorless and transparent in an RGB image.

As illustrated in the figure, oil has spectral intensity over a broad range in the near-infrared wavelength band. More specifically, while the spectral intensity of oil slightly decreases between around 1150 nm and around 1200 nm in a range from 900 nm to around 1350 nm, it increases as a whole, and increases from around 0.1 to around 1. While it temporarily increases between around 1410 nm to around 1480 nm in a range from around 1350 nm to around 1700 nm, it decreases as a whole, and decreases from around 1 to around 0.1.

The spectral intensity of water increases from just below 0.2 to around 1 in a range from 900 nm to around 1100 nm. While it temporarily increases between around 1150 nm to around 1270 nm in a range from around 1100 nm to around 1400 nm, it decreases as a whole, and decreases from around 1 to around 0.2. It stays approximately flat in a range from around 1400 nm to around 1700 nm, and slightly decreases between around 1650 nm to 1700.

In the following explanation, it is explained how differences in the filter sets influence NIR-R'G'B' converted image data to be generated if the single-lens reflex camera 200 captures an image of the above-mentioned two objects and generates the NIR-R'G'B' converted image data.

First, the case where the broad-type filter set is used is explained. As mentioned above, the spectral intensity of oil lies in a relatively broad range in the near-infrared wavelength band. Therefore, oil is recognized as being whitish in an NIR-R'G'B' converted image. On the other hand, because the spectral intensity of water increases sharply up to around 1100 nm, and decreases sharply in a range over around 1250 nm, it is considerably different from the spectral intensity of oil in the band up to around 1100 nm and the band over around 1200 nm. Because the spectral intensities corresponding to the wavelength bands of the $IR_2$ filter and the $IR_3$ filter are relatively low, water is recognized as being bluish overall in the NIR-R'G'B' converted image. In this manner, even if oil cannot be discriminated from water in terms of color in an RGB image generated based on visible wavelength band information, they can be discriminated easily in terms of color in an NIR-R'G'B' converted image generated based on near-infrared wavelength band information.

Next, the case where the narrow-type filter set is used is explained. Because oil has spectral intensity in a relatively broad range of the near-infrared wavelength band, similar to the case of using the broad-type filter set, it is recognized as being whitish in an NIR-R'G'B' converted image. Because in the spectral intensity of water, there is a band where the spectral intensity is highest at around 1280 nm, similar to the case of using the broad-type filter set, it is recognized as being bluish overall in an NIR-R'G'B' converted image. Furthermore, as mentioned above, if the narrow-type filter set is used, the transmitting wavelength band is more limited; as a result, an image on which color discrimination is easy is produced. The spectral intensities change depending on the amounts of oil and water. Therefore, differences in the amounts of oil and water can be expressed by colors in an NIR-R'G'B' converted image. In other words, the amounts of oil and water can be detected.

Figure 7:
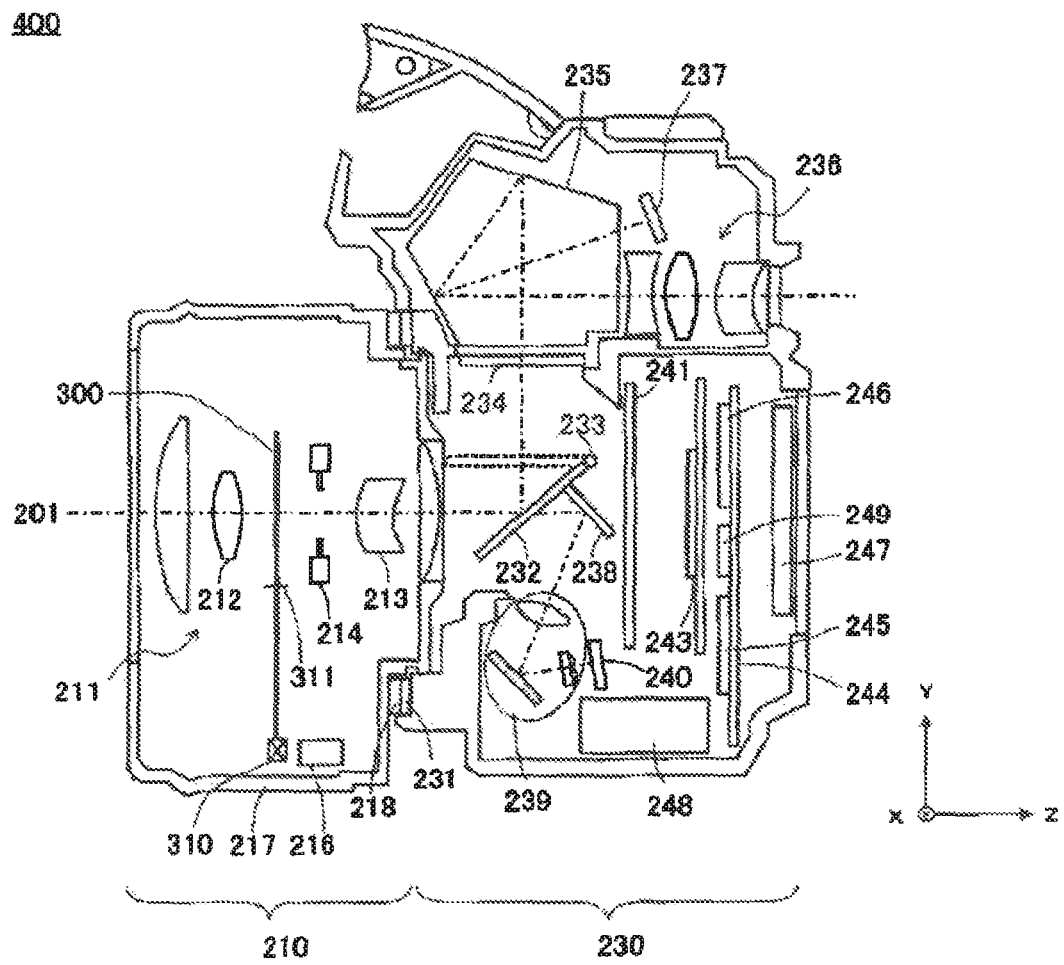
FIG. 7 is a cross sectional view of main parts of another single-lens reflex camera.

FIG. 7 is a cross sectional view of main parts of another single-lens reflex camera 400. The single-lens reflex camera 400 has a filter unit 300, an actuator 310 and a rotation axis 311 in addition to the configuration of the single-lens reflex camera 200 explained with reference to FIG. 1. The filter unit 300 is disposed between the focus lens 212 and the zoom lens 213 and crossing the optical axis 201. The camera system control unit 245 determines a combination by referring to a table according to setting by a user. Wavelength filters included in the determined combination are arranged in an order within the range of an object light flux, and an image capturing operation is performed in synchronization with the respective arrangements.

The filter unit 300 includes n types of wavelength filters that allow passage therethrough of mutually different wavelength band light within an object light flux. Here, similar to the configuration of the single-lens reflex camera 200 explained with reference to FIG. 1, the filter unit 300 includes six types of wavelength filters consisting of filters as wavelength filters. Because in the single-lens reflex camera 400 of the present example, the filter unit 300 includes wavelength filters, a wavelength filter is not formed on each photoelectric converting unit of the image sensor 243. The actuator 310 rotates the filter unit 300 about the rotation axis 311.

Figure 8:
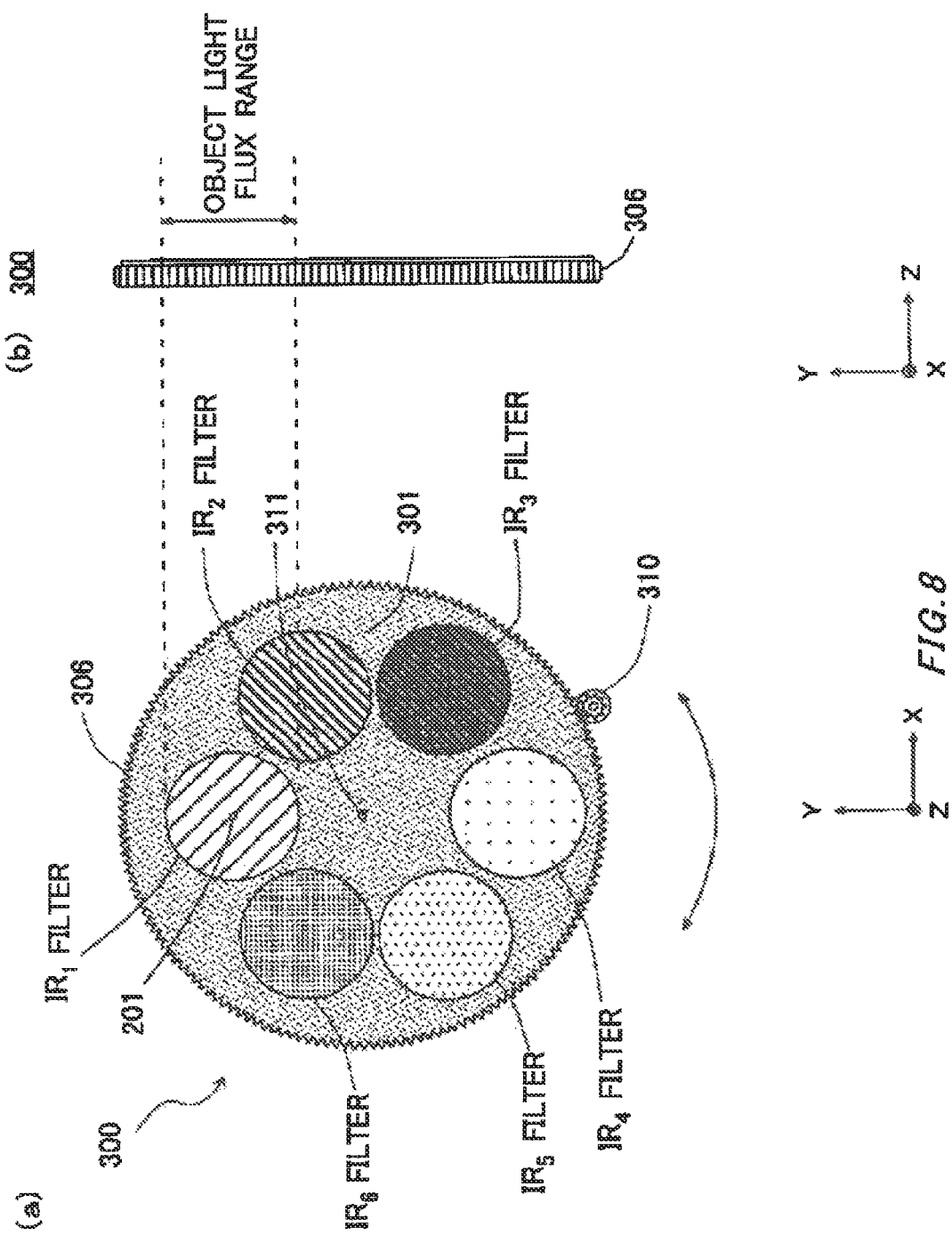
FIG. 8 is a figure for explaining a configuration of a filter unit.

FIG. 8 is a figure for explaining a configuration of the filter unit 300. (a) in FIG. 8 is a front view as seen from the direction of the optical axis 201, and (b) in FIG. 8 is a side view.

The filter unit 300 includes a holding frame 301 that holds wavelength filters. The holding frame 301 has a circular shape as a whole, and includes six openings with approximately the same sizes as an object light flux at symmetrical positions at intervals of 60 degrees therebetween with the rotation axis 311 as their center. The holding frame 301 is supported to be freely rotatable in the illustrated arrow direction. Gears 306 are provided all around the periphery of the holding frame 301. The gears 306 mesh with drive gears of the actuator 310.

The wavelength filters are placed in tense states in the respective six openings. That is, the respective six wavelength filters have sizes approximately the same with an object light flux. In the present example, among the six openings, the $IR_1$ filter is placed in a tense state in the central upper opening, and next to it, the $IR_2$ filter, the $IR_3$ filter, the $IR_4$ filter, the $IR_5$ filter and the $IR_6$ filter are respectively placed in tense states in an order clockwise therefrom.

The camera system control unit 245 rotates the filter unit 300 by drive of the actuator 310 via the lens system control unit 216. Thereby, one of the $IR_{1-6}$ filters can be disposed in an object light flux centering on the optical axis 201. Upon determining a combination, the camera system control unit 245 controls drive of the actuator 310 corresponding to the determined combination. When capturing an image of an object using the broad-type filter set, the $IR_1$ filter, the $IR_2$ filter and the $IR_3$ filter are arranged sequentially in the object light flux. The camera system control unit 245 performs an image capturing operation in synchronization with the respective arrangements of the filters. That is, image capturing operations are performed three times. Similarly, when capturing an image of an object using the narrow-type filter set, the $IR_4$ filter, the $IR_5$ filter and the $IR_6$ filter are arranged sequentially in the object light flux. The camera system control unit 245 performs an image capturing operation in synchronization with the respective arrangements of the $IR_{4-6}$ filters.

The image processing unit 246 sequentially acquires three pieces of image data corresponding to the filter set from the image sensor 243. If an image of an object is captured using the broad-type filter set, $IR_1$ filter plane image data, $IR_2$ filter plane image data and $IR_3$ filter plane image data which are image data corresponding to the respective wavelength bands of the $IR_{1-3}$ filters are acquired. The image processing unit 246 uses the $IR_1$ filter plane image data, the $IR_2$ filter plane image data and the $IR_3$ filter plane image data to perform the above-mentioned matrix operation to perform color conversion processing. If an image of an object is captured using the narrow-type filter set, $IR_4$ filter plane image data, $IR_5$ filter plane image data and $IR_6$ filter plane image data which are image data corresponding to the respective wavelength bands of the $IR_{4-6}$ filters are acquired. The image processing unit 246 uses the $IR_4$ filter plane image data, the $IR_5$ filter plane image data and the $IR_6$ filter plane image data to perform the above-mentioned matrix operation to perform color conversion processing. Because with a configuration using the filter unit 300, pixel signals corresponding to the respective wavelength bands of the $IR_{1-3}$ filters or pixel signals corresponding to the respective wavelength bands of the $IR_{4-6}$ filters can be obtained for all the pixels, the above-mentioned interpolation process needs not be performed.

In the holding frame 301, a plate portion forming the six openings is preferably formed with a non-transmissive member. Furthermore, its surface is preferably processed with a light-blocking member such as flocked paper. By taking such measures, it can be expected to block stray light inside a lens barrel.

Although in the explanation above, the broad-type filter set and the narrow-type filter set shown in FIG. 3A and FIG. 3B are mentioned as examples of filter sets, there are other varieties of broad-type filter sets and narrow-type filter sets. Although the narrow-type filter set is explained here as an example, the same applies also to the broad-type filter set. For example, while not changing the waveforms showing the respective wavelength characteristics of the $IR_{4-6}$ filters, their wavelength bands may be shifted in the longer wavelength direction or the shorter wavelength directions. Furthermore, as shown below, the waveforms showing wavelength characteristics may be changed.

FIG. 9A to FIG. 10B are figures for explaining other narrow-type filter sets. FIGS. 9A to 9D, and FIGS. 10A and 10B each show characteristics of another narrow-type filter set. In the respective figures, the horizontal axes indicate wavelengths [nm] and the vertical axes indicate transmittances [%].

Figure 9A:
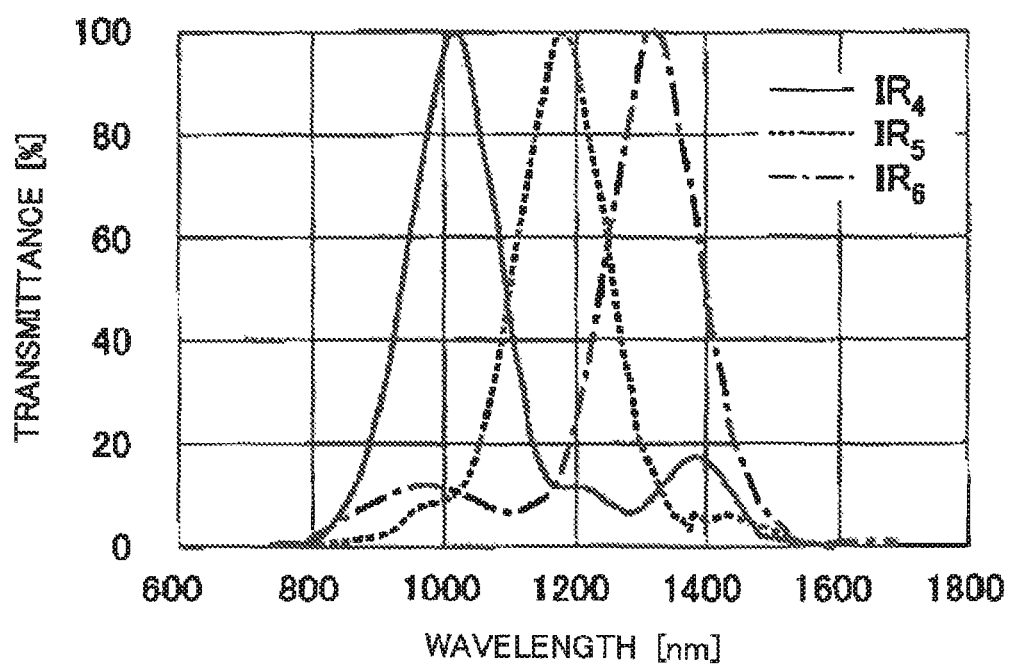
FIG. 9A is a figure for explaining another narrow-type filter set.

Similar to the narrow-type filter set explained with reference to FIG. 3B, the waveforms showing wavelength characteristics of the $IR_4$ filter, the $IR_5$ filter and the $IR_6$ filter shown in FIG. 9A are approximately the same overall, and their wavelength bands are different from each other. The respective half-value widths of the $IR_{4-6}$ filters are substantially the same. However, the relationship between the transmittance of the $IR_5$ filter and the transmittance of the $IR_6$ filter is reversed in a range from around 800 nm to around 1000 nm. That is, the transmittance of the $IR_5$ filter is lower than the transmittance of the $IR_6$ filter. Similarly, the relationship between the transmittance of the $IR_4$ filter and the transmittance of the $IR_5$ filter is reversed in a range from around 1320 nm to around 1450 nm. That is, the transmittance of the $IR_4$ filter is higher than the transmittance of the $IR_5$ filter. In this manner, the relationship among the $IR_{4-6}$ filters in terms of the magnitudes of transmittance may be reversed in a particular band.

Figure 9B:
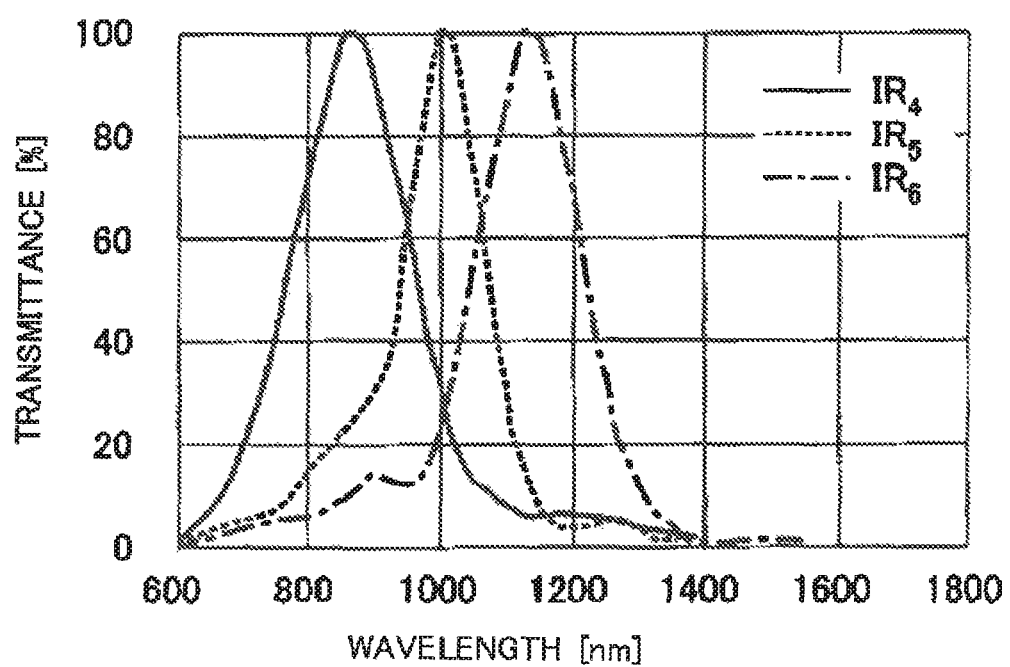
FIG. 9B is a figure for explaining another narrow-type filter set.

The waveforms showing wavelength characteristics of the $IR_4$ filter, the $IR_5$ filter and the $IR_6$ filter shown in FIG. 9B are approximately the same overall, and their wavelength bands are different from each other. However, paying attention to the half-value widths of the $IR_{4-6}$ filters, the half-value width of the $IR_4$ filter is largest and the half-value width of the $IR_5$ filter is smallest. In this manner, the respective half-value widths of the $IR_{4-6}$ filters may be different from each other. However, in terms of suppressing noise components attributable to gains, differences among the respective half-value widths of the $IR_{4-6}$ filters are preferably small.

Figure 9C:
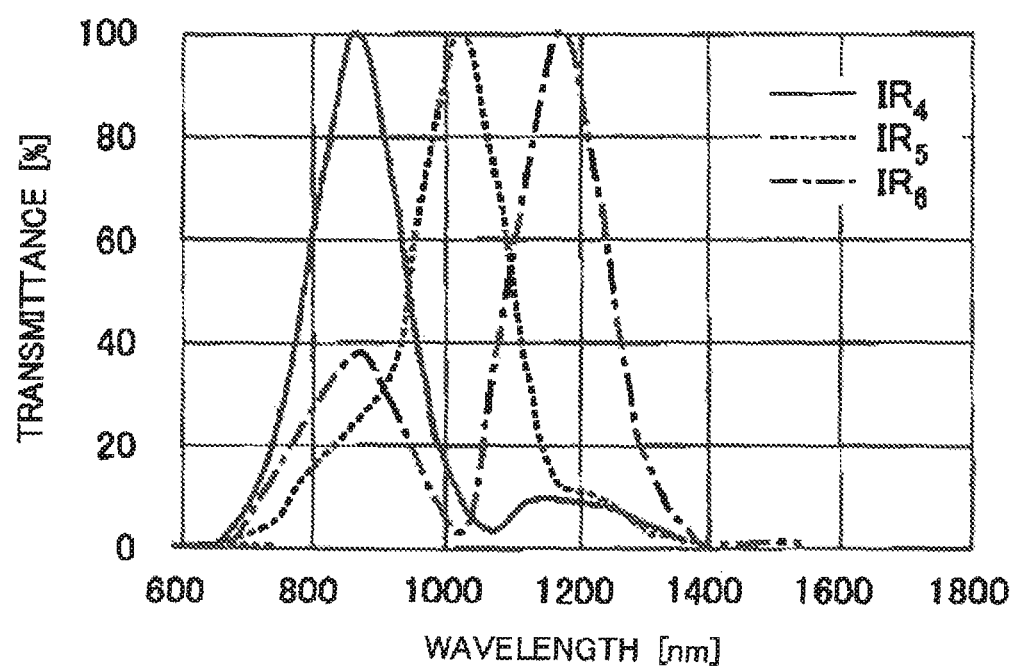
FIG. 9C is a figure for explaining another narrow-type filter set.

Regarding the $IR_4$ filter, the $IR_5$ filter and the $IR_6$ filter shown in FIG. 9C, the secondary peak wavelength of the $IR_6$ filter is at the peak wavelength of the $IR_4$ filter. Also, in a range from around 700 nm to around 900 nm, the relationship between the transmittance of the $IR_5$ filter and the transmittance of the $IR_6$ filter is reversed. That is, the transmittance of the $IR_5$ filter is smaller than the transmittance of the $IR_6$ filter.

Figure 9D:
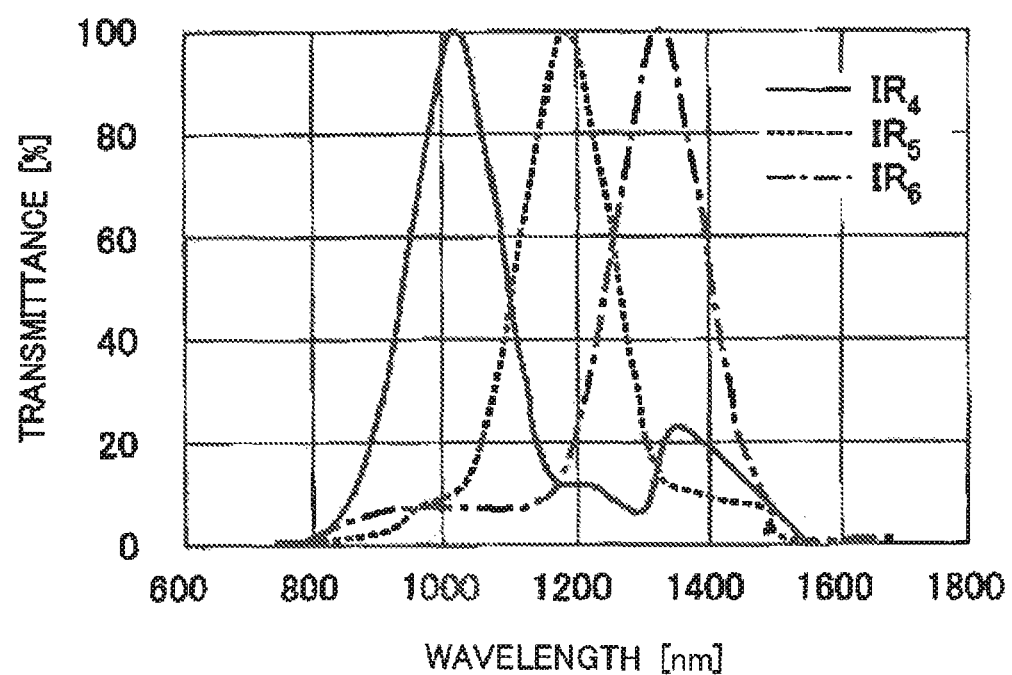
FIG. 9D is a figure for explaining another narrow-type filter set.

Regarding the $IR_4$ filter, the $IR_5$ filter and the $IR_6$ filter shown in FIG. 9D, the secondary peak wavelength of the $IR_4$ filter is at the peak wavelength of the $IR_6$ filter. Also, in a range from around 1300 nm to around 1500 nm, the relationship between the transmittance of the $IR_5$ filter and the transmittance of the $IR_6$ filter is reversed. That is, the transmittance of the $IR_5$ filter is smaller than the transmittance of the $IR_6$ filter.

As illustrated in FIGS. 9C and 9D, each filter among the $IR_{4-6}$ filters may have its secondary peak wavelength at the peak wavelength of another IR filter. Furthermore, the relationship among the $IR_{4-6}$ filters in terms of the magnitudes of transmittance may be reversed in a particular band.

Figure 10A:
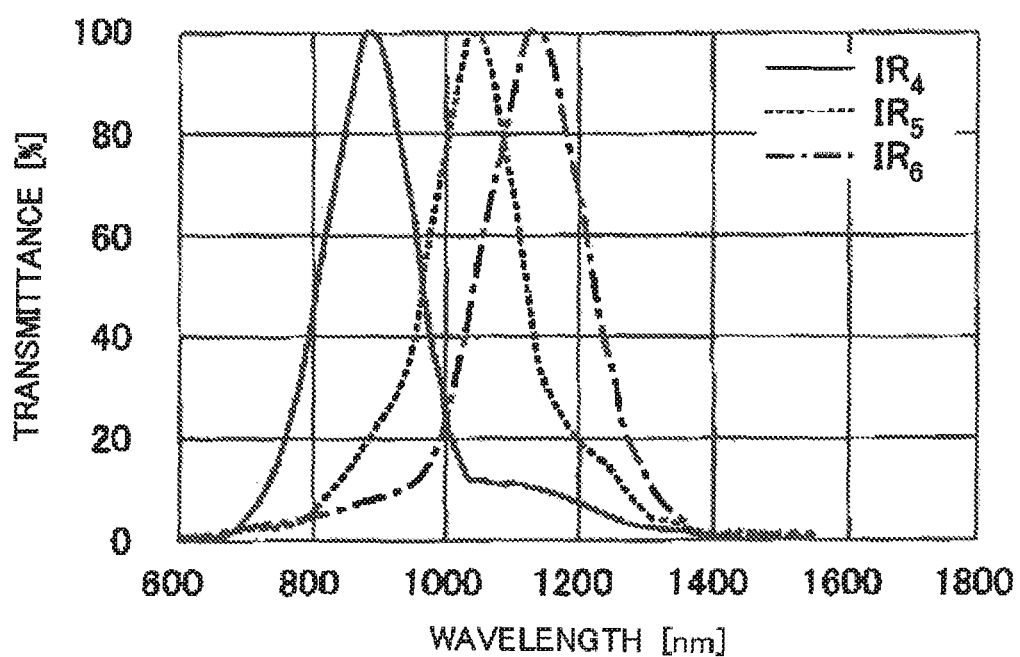
FIG. 10A is a figure for explaining another narrow-type filter set.

Regarding the $IR_4$ filter, the $IR_5$ filter and the $IR_6$ filter shown in FIG. 10A, the transmittance at the intersection between the $IR_4$ filter and the $IR_5$ filter is different from the transmittance at the intersection between the $IR_5$ filter and the $IR_6$ filter. However, in terms of suppressing noise components attributable to gains, differences between the transmittances at the respective intersections are preferably small.

Figure 10B:
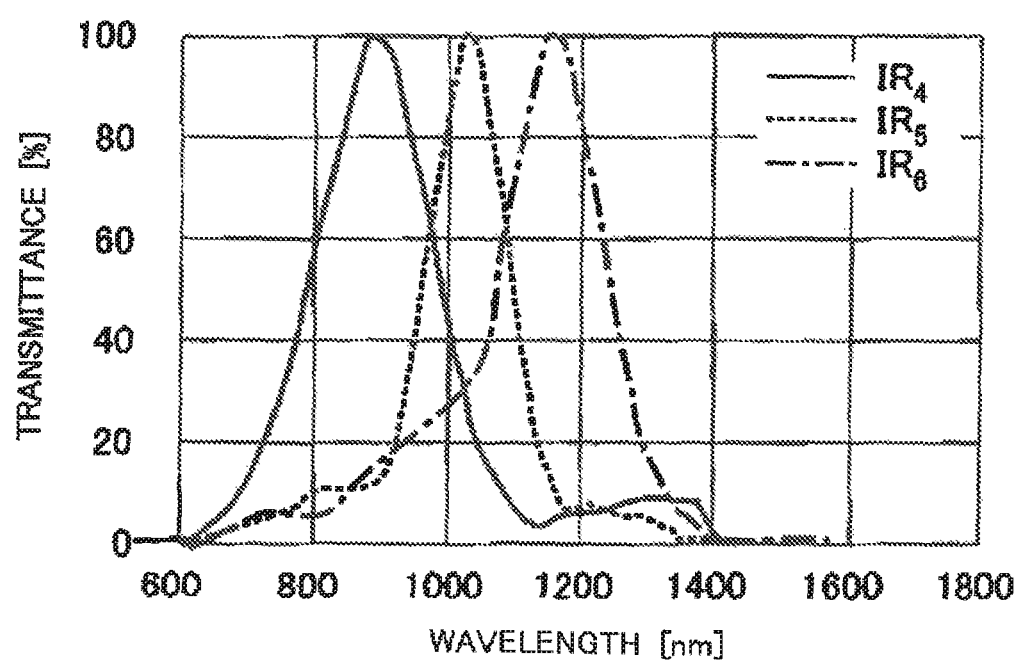
FIG. 10B is a figure for explaining another narrow-type filter set.

The waveforms showing wavelength characteristics of the $IR_4$ filter, the $IR_5$ filter and the $IR_6$ filter shown in FIG. 10B are approximately the same overall, and their wavelength bands are different from each other. However, paying attention to the half-value widths of the $IR_{4-6}$ filters, the half-value width of the $IR_4$ filter is largest and the half-value width of the $IR_5$ filter is smallest. Also, the relationship between the transmittance of the $IR_5$ filter and the transmittance of the $IR_6$ filter is reversed in a range from around 850 nm to around 920 nm, and further is reversed again in a range from around 750 nm to around 850 nm. That is, in a range from around 850 nm to around 920 nm, the transmittance of the $IR_5$ filter becomes lower than the transmittance of the $IR_6$ filter, and in a range from around 750 nm to around 850 nm, the transmittance of the $IR_5$ filter becomes higher than the transmittance of the $IR_6$ filter. In this manner, the relationship among the $IR_{4-6}$ filters in terms of the magnitudes of transmittance may be reversed multiple times.

Although in the explanation above, the shortest-wavelength at which the shortest-wavelength side wavelength filter among wavelength filters included in a filter set has a transmittance of 1% or higher is defined as X1, the longest-wavelength at which the longest-wavelength side wavelength filter among them has a transmittance of 1% or higher is defined as X2, and the range from X1 to X2 is defined as an effective wavelength band, they may have transmittances higher than 1% again outside the effective wavelength band in some cases. Because spectrum components outside the effective wavelength band become noise components in generating image data, they are preferably eliminated.

Figure 11:
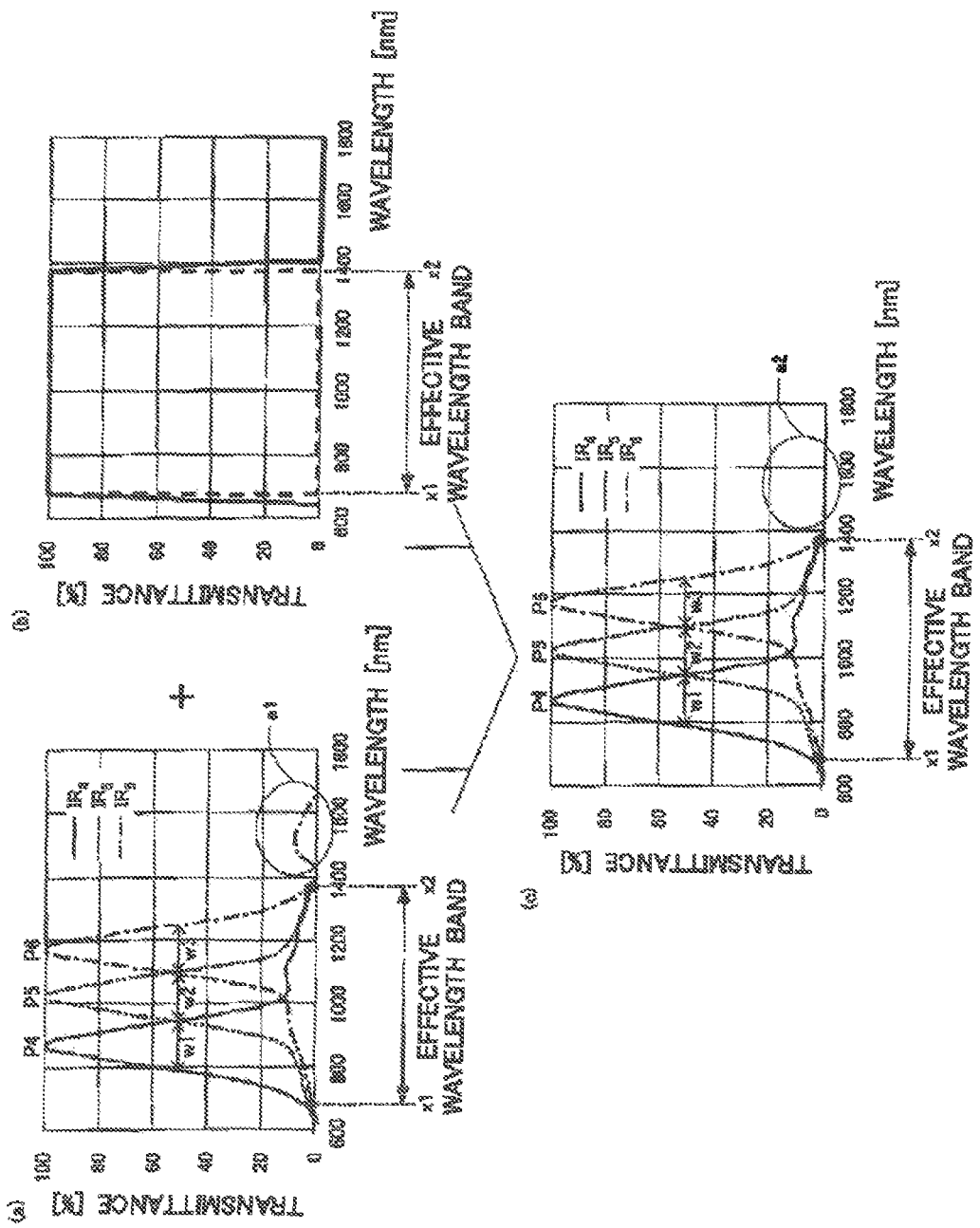
FIG. 11 is a figure for explaining a method for eliminating components outside an effective band.

FIG. 11 is a figure for explaining a method for eliminating components outside an effective wavelength band. (a) in FIG. 11 shows characteristics of a narrow-type filter set. The horizontal axis indicates wavelengths [nm] and the vertical axis indicates transmittances [%]. As illustrated in the figure, the $IR_6$ filter has a transmittance higher than 1% in a range from around 1450 nm to around 1650 nm, that is, outside its effective wavelength band (please see the oval portion a1). (b) in FIG. 11 shows characteristics of a bandpass filter. The horizontal axis indicates wavelengths [nm] and the vertical axis indicates transmittances [%]. The bandpass filter is set corresponding to the effective wavelength band shown in (a) in FIG. 11. Specifically, the bandpass filter allows passage therethrough of light in a wavelength band from around 650 nm to around 1400 nm. (c) in FIG. 11 shows characteristics of the narrow-type filter set after the bandpass filter shown in (b) in FIG. 11 is applied thereto. As illustrated in the figure, due to the bandpass filter, the transmittance of the $IR_6$ filter becomes sufficiently low in a range from around 1450 nm to around 1650 nm, that is, outside its effective wavelength band (please see the oval portion a2). In this manner, noise components can be eliminated using a bandpass filter corresponding to an effective wavelength band.

Although in the explanation above, a range between the shortest-wavelength X1 at which the shortest-wavelength side wavelength filter has a transmittance of 1% or higher and the longest-wavelength X2 at which the longest-wavelength side wavelength filter has a transmittance of 1% or higher is defined as an effective wavelength band, the effective wavelength band is not limited to this range. For example, the shortest-wavelength at which the shortest-wavelength side wavelength filter has a transmittance of 5% or higher may be defined as X1, the longest-wavelength at which the longest-wavelength side wavelength filter has a transmittance of 5% or higher may be defined as X2, and the range between X1 and X2 may be defined as the effective wavelength band. Although in the explanation above, a wavelength filter that allows passage therethrough mainly of light in a short-wavelength side wavelength band in the near-infrared wavelength band is mentioned as an exemplary wavelength filter, a wavelength filter that allows passage therethrough of light in a long-wavelength side wavelength band may be used. Such an example is explained below.

Figure 12:
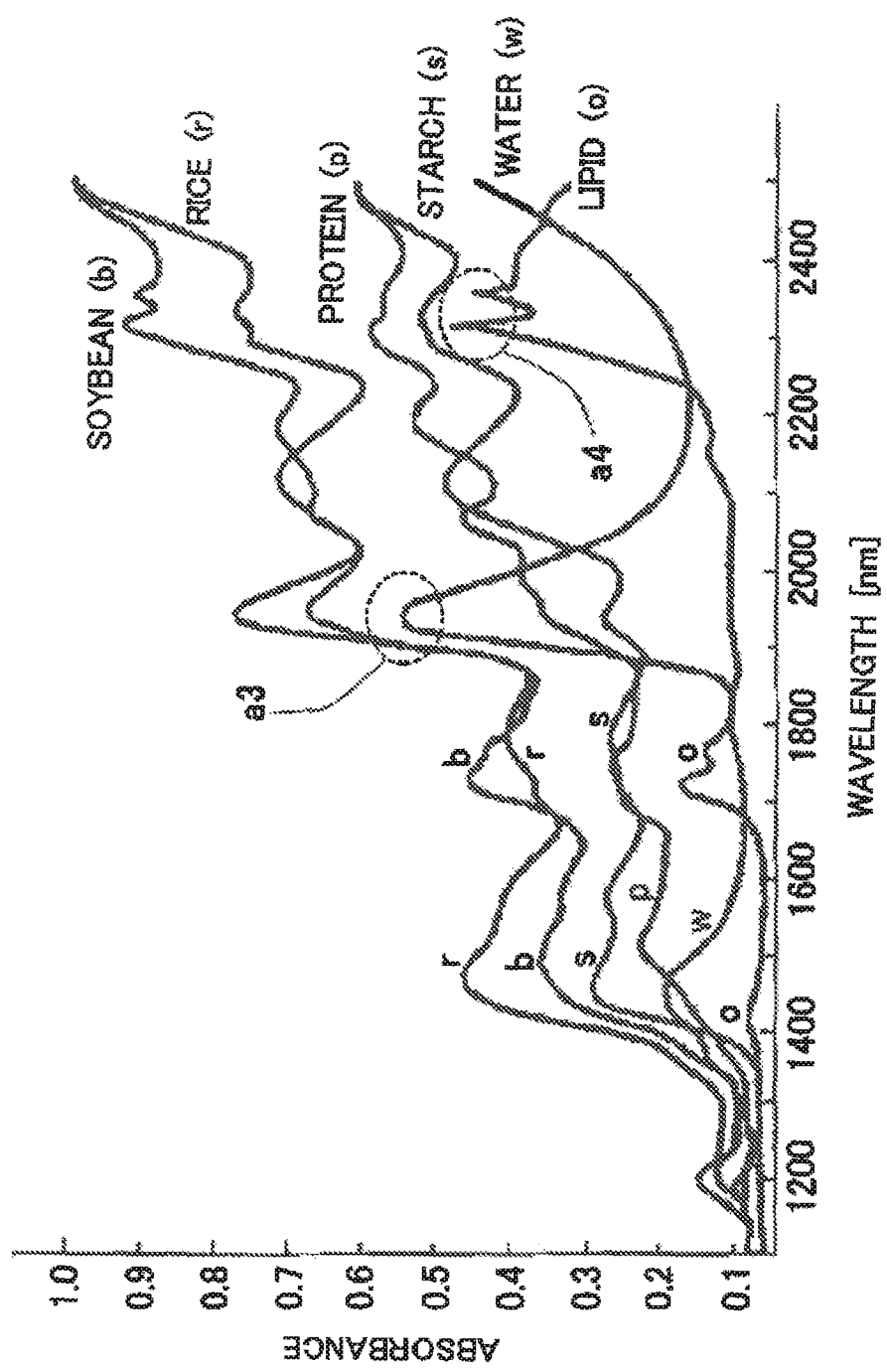
FIG. 12 is a figure for explaining near-infrared spectrums of six components.

FIG. 12 is a figure for explaining near-infrared spectrums of six components. Specifically, spectrums of soybean, rice, protein, starch, water and lipid in a range from 1100 nm to 2500 nm are shown. The horizontal axis indicates wavelengths [nm] and the vertical axis indicates absorbance [%].

As illustrated in the oval portion a3, the peak wavelength of water is about 1935 nm in a range from 1100 nm to 2500 nm. Therefore, water in an object can be detected using a wavelength filter that allows passage therethrough of light in a wavelength band around 1935 nm, for example, a range from 1900 nm to 2100 nm as a wavelength filter. On the other hand, using a wavelength filter that allows passage therethrough of light in a wavelength band excluding a wavelength band around 1935 nm, for example a range from 1600 nm to 1800 nm, influence of absorption by water in an object can be suppressed, and NIR-R'G'B' converted image data on which color discrimination is easy can be generated.

As illustrated in the oval portion a4, the peak wavelength of lipid is about 2305 nm and about 2345 nm in a range from 1100 nm to 2500 nm. Therefore, lipid in an object can be detected using a wavelength filter that allows passage therethrough of light in a wavelength band around about 2305 nm and about 2345 nm, for example, a range from 2200 nm to 2400 nm as a wavelength filter. On the other hand, using a wavelength filter that allows passage therethrough of light in a wavelength band excluding a wavelength band around 2305 nm and 2345 nm, for example a range from 2000 nm to 2200 nm, influence of absorption by lipid in an object can be suppressed, and NIR-R'G'B' converted image data on which color discrimination is easy can be generated.

Although detailed explanation is omitted here, the same applies also to soybean, rice, protein and starch. That is, using wavelength filters that allow passage therethrough of light in wavelength bands around their respective peak wavelengths, the corresponding components in an object can be detected, and using a wavelength filter of a wavelength band at which absorbance is relatively low, influence of absorption due to the corresponding component in an object can be suppressed, and NIR-R'G'B' converted image data on which color discrimination is easy can be generated.

Although in the examples shown in FIG. 5 and FIG. 6, NIR-R'G'B' converted image data on which color discrimination is easy is generated using wavelength bands having relatively large differences in terms of the spectrums of respective objects, as explained with reference to FIG. 12, NIR-R'G'B' converted image data on which color discrimination is easy can also be generated using bands from which bands that are susceptible to the influence of absorption are excluded.

Although in the explanation above, the camera system control unit 245 determines a combination by referring to a table, the combination may be determined corresponding to selection of any m types of wavelength filters by a user. The camera system control unit 245 may analyze an object by pre-capturing and automatically determine a combination corresponding to the analysis results. The camera system control unit 245 may select a broad-type filter set if the spectrum of an object is not identified. As a first process, the image processing unit 246 may use pixel signals of pixels associated with wavelength filters belonging to either one of a broad-type filter set and a narrow-type filter set to generate NIR-R'G'B' converted image data. If a user input indicating that this NIR-R'G'B' converted image data is not suited to color discrimination has been accepted, as a second process, it may use pixel values of pixels associated with the other filter set to generate NIR-R'G'B' converted image data. Also, a readout control unit of the image sensor 243 may not read out pixel signals of all the pixels, but may read out only pixel signals of pixels corresponding to either one of a broad-type filter set and a narrow-type filter set and output them to the image processing unit 246.

The image processing unit 246 may add pixel signals of a plurality of pixels associated with wavelength filters of mutually different wavelength bands. For example, a pixel signal of a pixel associated with a wavelength filter of a wavelength band range from 1100 nm to 1500 nm and a pixel signal of a pixel associated with a wavelength filter of a wavelength band range from 1300 nm to 1700 nm are added together. By doing so, a pixel signal of a pixel associated with a wavelength filter of a wavelength band range from 1100 nm to 1700 nm may approximately be obtained. Thereby, the types of wavelength filters can be increased substantially.

Although in the explanation above, the $IR_{1-6}$ filter that allow passage therethrough of light in the near-infrared wavelength band are used as wavelength filters, a filter that allows passage therethrough of light in a longer-wavelength side wavelength band than the near-infrared wavelength band may be used, or a filter that allows passage therethrough of a shorter-wavelength side wavelength band than the visible wavelength band may be used. The image sensor 243 is determined as appropriate so as to be sensitive to light in a wavelength band of a wavelength filter used. Also, the image sensor 243 may be provided with a near-infrared wavelength filter and an RGB color filter that are mixed therein.

Although in the explanation above, the broad-type and narrow-type filter sets each include three wavelength filters of mutually different wavelength bands, they may each include four filter sets of mutually different wavelength bands. Also, although the number of types of filter sets was two (broad-type and narrow-type), it may be three or larger. For example, a standard-type filter set of a wavelength bandwidth between the wavelength bandwidth of the broad-type filter set and the wavelength bandwidth of the narrow-type filter may be provided. Furthermore, the number of types of filter sets may be one, and in this case, the filter set includes four or more wavelength filters of mutually different wavelength bands. The image processing unit 246 can generate NIR-R'G'B' converted image data using pixel signals of pixels corresponding to at least three wavelength filters among the four or more wavelength filters.

Although in the explanation above, only one image sensor 243 is arranged, a plurality of them may be arranged depending on the number of wavelength filters. If the above-mentioned example is used, six image sensors 243 are arranged. In each image sensor among the six image sensors 243, a single IR filter that is among the filters and is different from the others is formed. By guiding an object light flux to each image sensor among the six image sensors 243, pixel signals of six wavelength bands can be obtained for all the pixels. Specifically, five half mirrors and one image sensor 243 among six image sensors 243 may be arranged along an optical axis, and the remaining five image sensors 243 may be arranged vertical to the optical axis 201 such that they correspond to the five half mirrors, respectively.

Although in the embodiments above, a single-lens reflex camera is explained as an example of an image capturing apparatus, the above-mentioned aspects may be applied not only to single-lens reflex cameras but to various image capturing apparatuses. For example, they can be applied to medical apparatuses, food evaluation apparatus and the like. Also, although in the explanation above, a wavelength filter that allows passage therethrough of invisible wavelength band light is mentioned as an example, the same applies also to a wavelength filter that allows passage therethrough of visible wavelength band light. For example, if red is to be expressed vividly, a wavelength filter that allows passage therethrough of an object light flux in a narrow wavelength band may be used.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An image capturing apparatus comprising:
   a plurality of photoelectric converting elements that have a light reception sensitivity to light in a wavelength band from 600 nm to 2500 nm, and receive an object light flux to output pixel signals;
   n types of wavelength filters (n is a natural number equal to or higher than four) that allow passage therethrough of light that is included in the object light flux and is in wavelength bands that are respectively different and each include the wavelength band from 600 nm to 2500 nm; and an image data generator that generates image data using the pixel signal output from a photoelectric converting element among the plurality of photoelectric converting elements that has received the object light flux that has passed through one of m types of the wavelength filters (m is a natural number equal to or larger than three and smaller than n) a combination of which is determined based on a predetermined condition, wherein the combination is determined such that among the respective wavelength bands of the m types of wavelength filters, a shortest-wavelength side wavelength band and a longest-wavelength side wavelength band overlap, and each wavelength filter among the m types of wavelength filters allows passage therethrough of light in the wavelength band including a predetermined effective wavelength band.

2. The image capturing apparatus according to claim 1, wherein the image data generator generates the image data representing a color image as a visible image by treating the pixel signal as a pixel signal corresponding to a visible band.

3. The image capturing apparatus according to claim 1, wherein the combination is determined such that a half-value width of the wavelength band of each wavelength filter among the m types of wavelength filters is equal to each other.

4. The image capturing apparatus according to claim 3, wherein the n types of wavelength filters have a plurality of filter sets constituted with a plurality of the wavelength filters half-value widths of the wavelength bands of which are equal to each other, and the plurality of filter sets have half-value widths of the wavelength bands that are different from each other, and one of the plurality of filter set is determined as the combination of the m types of wavelength filters.

5. The image capturing apparatus according to claim 4, wherein the plurality of filter sets have maximum transmittances that are equal to each other.

6. The image capturing apparatus according to claim 1, wherein, between two wavelength filters among the n types of wavelength filters, peak wavelengths of which are adjacent to each other, a half-value width of each wavelength filter among the two wavelength filters is larger than a difference in the peak wavelengths between the two wavelength filters.

7. The image capturing apparatus according to claim 1, wherein among at least three wavelength filters among the n types of wavelength filters, peak wavelengths of which are adjacent to each other, a transmittance at an intersection between wavelength bands of a shortest-wavelength side wavelength filter and a longest-wavelength side wavelength filter is 10% or higher.

8. The image capturing apparatus according to claim 1, wherein each wavelength filter among the m types of wavelength filters allows passage therethrough of light in, as the effective wavelength band, a wavelength band within a range between a shortest-wavelength side wavelength having a preset transmittance in a shortest-wavelength side wavelength filter and a longest-wavelength side wavelength having a preset transmittance in a longest-wavelength side wavelength filter among the m types of wavelength filters.

9. The image capturing apparatus according to claim 1, wherein a transmittance at an intersection between adjacent wavelength bands among the respective wavelength bands of the m types of wavelength filters is 50% or higher.

10. The image capturing apparatus according to claim 1, comprising an accepting unit that accepts an instruction from a user, wherein the combination is determined based on the instruction.

11. The image capturing apparatus according to claim 1, wherein the combination is determined by being selected from among a preset plurality of combinations.

12. The image capturing apparatus according to claim 1, comprising an image sensor in which the wavelength filter is provided corresponding to each photoelectric converting element among the plurality of photoelectric converting elements, wherein the image data generator uses pixel signals corresponding to the m types of wavelength filters among the pixel signals output from the image sensor to generate the image data.

13. The image capturing apparatus according to claim 1, comprising:

an image sensor having the plurality of photoelectric converting elements; and a filter unit that holds the n types of wavelength filters, and selectively arranges one of the wavelength filters so as to allow passage therethrough of the object light flux reaching the plurality of photoelectric converting elements, wherein the image data generator uses the pixel signals sequentially output from the image sensor resulting from respective arrangements of the m types of wavelength filters to generate the image data.

14. An image data generating method to be used in an image capturing apparatus having:

a plurality of photoelectric converting elements that have a light reception sensitivity to light in a wavelength band from 600 nm to 2500 nm, and receive an object light flux to output pixel signals; and n types of wavelength filters (n is a natural number equal to or higher than four) that allow passage therethrough of light that is included in the object light flux and is in wavelength bands that are respectively different and each include the wavelength band from 600 nm to 2500 nm, the method comprising:

determining a combination of m types of the wavelength filters (m is a natural number equal to or larger than three and smaller than n) among the plurality of photoelectric converting elements based on a predetermined condition; and generating image data using the pixel signal output from a photoelectric converting element that has received the object light flux having passed through one of the m types of wavelength filters, wherein the combination is determined such that among the respective wavelength bands of the m types of wavelength filters, a shortest-wavelength side wavelength band and a longest-wavelength side wavelength band overlap, and each wavelength filter among the m types of wavelength filters allows passage therethrough of light in the wavelength band including a predetermined effective wavelength band.

* * * * *